(12) United States Patent
Bedhapudi et al.

(10) Patent No.: US 12,688,291 B2
(45) Date of Patent: *Jul. 21, 2026

(54) RANSOMWARE DETECTION AND DATA PRUNING MANAGEMENT

(71) Applicant: Commvault Systems, Inc., Tinton Falls, NJ (US)

(72) Inventors: PurnaChandra Sekhar Bedhapudi, Eatontown, NJ (US); Sri Karthik Bhagi, Morganville, NJ (US); Deepak Raghunath Attarde, Marlboro, NJ (US); Arun Prasad Amarendran, Manalapan, NJ (US); Amit Bhaskar Ausarkar, Ocean, NJ (US); Mrityunjay Upadhyay, Hyderabad (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/800,976

(22) Filed: Aug. 12, 2024

(65) Prior Publication Data

US 2025/0045397 A1 Feb. 6, 2025

Related U.S. Application Data

(63) Continuation of application No. 17/173,816, filed on Feb. 11, 2021, now Pat. No. 12,093,386, which is a
(Continued)

(51) Int. Cl.
*H04L 9/00* (2022.01)
*G06F 16/17* (2019.01)
(Continued)

(52) U.S. Cl.
CPC ........ *G06F 21/566* (2013.01); *G06F 16/1734* (2019.01); *G06F 16/1752* (2019.01); *G06F 2221/034* (2013.01); *G06F 2221/2101* (2013.01)

(58) Field of Classification Search
CPC . G06F 21/566; G06F 16/1752; G06F 16/1734
(Continued)

(56) References Cited

U.S. PATENT DOCUMENTS

| | | | |
|---|---|---|---|
| 4,084,231 A | 4/1978 | Capozzi et al. | |
| 4,267,568 A | 5/1981 | Dechant et al. | |

(Continued)

FOREIGN PATENT DOCUMENTS

| | | |
|---|---|---|
| AU | 2010339584 A1 | 7/2012 |
| CN | 101986324 | 3/2011 |

(Continued)

OTHER PUBLICATIONS

17173816, InnovationQ Plus (Year: 2023), in 1 page.
(Continued)

*Primary Examiner* — Christopher J Brown
(74) *Attorney, Agent, or Firm* — Knobbe, Martens, Olson & Bear, LLP

(57) ABSTRACT

This application relates to ransomware detection and data pruning management. Ransomware typically involves an I/O heavy process of encrypting data files and/or deleting or renaming the original files. Thus, ransomware attacks may be detected by analyzing the I/O activity in a given file system. In some embodiments, a software module running on a client machine manages copying, archiving, migrating, and/or replicating of primary data and restoring and/or pruning secondary data (e.g., backup copies of the primary data). When a potential ransomware attack is detected, the software module is immediately stopped so that the software
(Continued)

module does not prune any data that may need to be restored. Upon receiving user input that indicates that the client machine is not under a ransomware attack, the software module is allowed to resume its operations, including pruning of the secondary data.

14 Claims, 29 Drawing Sheets

Related U.S. Application Data continuation of application No. 16/129,623, filed on Sep. 12, 2018, now abandoned.

(60) Provisional application No. 62/558,752, filed on Sep. 14, 2017.

(51) Int. Cl.
  *G06F 16/174* (2019.01)
  *G06F 21/56* (2013.01)

(58) Field of Classification Search
  USPC ........................................................... 726/23
  See application file for complete search history.

(56) References Cited

U.S. PATENT DOCUMENTS

| | | | |
|---|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,827,400 A | 5/1989 | Dunwell et al. |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,329,465 A | 7/1994 | Arcella et al. |
| 5,347,653 A | 9/1994 | Flynn et al. |
| 5,410,295 A | 4/1995 | Van Lint |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 5,734,817 A | 3/1998 | Roffe et al. |
| 5,781,703 A | 7/1998 | Desai et al. |
| 6,073,172 A | 6/2000 | Frailong et al. |
| 6,418,478 B1 | 7/2002 | Ignatius et al. |
| 6,542,972 B2 | 4/2003 | Oshinsky et al. |
| 6,658,436 B2 | 12/2003 | Oshinsky et al. |
| 6,721,767 B2 | 4/2004 | Meno et al. |
| 6,760,723 B2 | 7/2004 | Oshinsky et al. |
| 6,795,856 B1 | 9/2004 | Bunch |
| 6,959,368 B1 | 10/2005 | St. Pierre et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,107,416 B2 | 9/2006 | Stuart et al. |
| 7,130,970 B2 | 10/2006 | Devassy et al. |
| 7,162,496 B2 | 1/2007 | Amarendran et al. |

| | | | |
|---|---|---|---|
| 7,174,433 B2 | 2/2007 | Kottomtharayil et al. |
| 7,213,176 B2 | 5/2007 | Banko |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,502,972 B1 | 3/2009 | Chilukuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,779,021 B1 | 8/2010 | Smith et al. |
| 7,801,864 B2 | 9/2010 | Prahlad et al. |
| 7,809,914 B2 | 10/2010 | Kottomtharayil et al. |
| 7,895,167 B2 | 2/2011 | Berg et al. |
| 7,975,262 B2 | 7/2011 | Cozmei |
| 8,077,341 B2 | 12/2011 | Hull et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,266,159 B2 | 9/2012 | Torres |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,396,838 B2 | 3/2013 | Brockway et al. |
| 8,407,673 B2 | 3/2013 | Terpolilli |
| 8,495,060 B1 * | 7/2013 | Chang ................... G06Q 10/00 |
| | | 707/723 |
| 8,527,468 B1 | 9/2013 | Crafford et al. |
| 8,578,120 B2 | 11/2013 | Attarde et al. |
| 8,601,323 B2 | 12/2013 | Tsantilis |
| 8,874,967 B2 | 10/2014 | Spafford et al. |
| 8,904,243 B2 | 12/2014 | Loimuneva et al. |
| 8,954,446 B2 | 2/2015 | Vijayan Retnamma et al. |
| 8,959,299 B2 | 2/2015 | Ngo et al. |
| 9,020,900 B2 | 4/2015 | Vijayan Retnamma et al. |
| 9,098,495 B2 | 8/2015 | Gokhale |
| 9,158,469 B2 | 10/2015 | Winter |
| 9,239,687 B2 | 1/2016 | Vijayan et al. |
| 9,244,779 B2 | 1/2016 | Littlefield et al. |
| 9,391,825 B1 | 7/2016 | Beal et al. |
| 9,405,928 B2 | 8/2016 | Amarendran |
| 9,424,271 B2 | 8/2016 | Tata |
| 9,444,811 B2 | 9/2016 | Nara |
| 9,633,033 B2 | 4/2017 | Vijayan et al. |
| 9,639,274 B2 | 5/2017 | Maranna et al. |
| 9,661,023 B1 | 5/2017 | Fang et al. |
| 9,766,825 B2 | 9/2017 | Bhagi |
| 9,852,026 B2 | 12/2017 | Mitkar et al. |
| 9,934,265 B2 | 4/2018 | Karandikar et al. |
| 10,007,795 B1 | 6/2018 | Chung et al. |
| 10,009,360 B1 | 6/2018 | Todd et al. |
| 10,061,663 B2 | 8/2018 | Vijayan et al. |
| 10,121,003 B1 | 11/2018 | Adams |
| 10,138,729 B2 | 11/2018 | Fliearman |
| 10,210,330 B1 | 2/2019 | Chen |
| 10,228,962 B2 | 3/2019 | Dornemann et al. |
| 10,255,143 B2 | 4/2019 | Vijayan et al. |
| 10,296,613 B2 | 5/2019 | Karandikar et al. |

(56) References Cited

U.S. PATENT DOCUMENTS

| | | | |
|---|---|---|---|
| 10,310,953 B2 | 6/2019 | Vijayan | |
| 10,331,885 B2 | 6/2019 | Chelarescu et al. | |
| 10,366,096 B2 | 7/2019 | Ferrar | |
| 10,387,266 B2 | 8/2019 | Kumarasamy et al. | |
| 10,545,699 B2 | 1/2020 | Baptist et al. | |
| 10,592,145 B2 | 3/2020 | Bedadala et al. | |
| 10,592,357 B2 | 3/2020 | Vijayan et al. | |
| 10,650,146 B1 | 5/2020 | Gaurav et al. | |
| 10,684,924 B2 | 6/2020 | Kilaru et al. | |
| 10,902,119 B1 | 1/2021 | Vashisht et al. | |
| 11,100,064 B2 | 8/2021 | Dwarampudi et al. | |
| 11,574,050 B2 | 2/2023 | Bhagi et al. | |
| 11,625,481 B2 | 4/2023 | Miller et al. | |
| 12,026,252 B2 | 7/2024 | Bhagi et al. | |
| 12,093,386 B2 | 9/2024 | Bedhapudi et al. | |
| 2002/0186131 A1 | 12/2002 | Fettis | |
| 2004/0003316 A1 | 1/2004 | Meng et al. | |
| 2004/0187029 A1 | 9/2004 | Ting | |
| 2005/0138642 A1 | 6/2005 | Breh et al. | |
| 2005/0192921 A1 | 9/2005 | Chaudhuri et al. | |
| 2006/0031942 A1 | 2/2006 | Jones et al. | |
| 2006/0036989 A1 | 2/2006 | Chaudhuri et al. | |
| 2006/0075306 A1 | 4/2006 | Chandrasekaran | |
| 2006/0218637 A1 | 9/2006 | Thomas et al. | |
| 2006/0224846 A1 | 10/2006 | Amarendran et al. | |
| 2007/0220602 A1 | 9/2007 | Ricks et al. | |
| 2008/0022209 A1 | 1/2008 | Lyle | |
| 2008/0163333 A1 | 7/2008 | Kasralikar | |
| 2008/0183805 A1 | 7/2008 | Cancel et al. | |
| 2008/0228998 A1 | 9/2008 | Colecchia et al. | |
| 2008/0243882 A1 | 10/2008 | Bailey et al. | |
| 2008/0288215 A1 | 11/2008 | Duberry | |
| 2008/0300900 A1 | 12/2008 | Demarest et al. | |
| 2009/0038010 A1 | 2/2009 | Ma et al. | |
| 2009/0254655 A1 | 10/2009 | Kidwell et al. | |
| 2009/0276205 A1 | 11/2009 | Jennings et al. | |
| 2009/0319534 A1 | 12/2009 | Gokhale | |
| 2009/0328119 A1 | 12/2009 | Kan et al. | |
| 2009/0328186 A1 | 12/2009 | Pollutro et al. | |
| 2010/0043072 A1 | 2/2010 | Rothwell | |
| 2010/0123575 A1 | 5/2010 | Mittal et al. | |
| 2010/0125554 A1 | 5/2010 | Jennings et al. | |
| 2010/0169472 A1 | 7/2010 | Okamoto et al. | |
| 2010/0185632 A1 | 7/2010 | Ylonen | |
| 2011/0093461 A1 | 4/2011 | Mui et al. | |
| 2011/0093471 A1 | 4/2011 | Brockway et al. | |
| 2012/0011153 A1 | 1/2012 | Buchanan et al. | |
| 2012/0016839 A1 | 1/2012 | Yueh | |
| 2012/0113265 A1 | 5/2012 | Galvin | |
| 2012/0150818 A1 | 6/2012 | Vijayan Retnamma et al. | |
| 2012/0150826 A1 | 6/2012 | Vijayan Retnamma et al. | |
| 2012/0173567 A1 | 7/2012 | Zavatone et al. | |
| 2012/0179809 A1 | 7/2012 | Barsness et al. | |
| 2012/0203895 A1 | 8/2012 | Jaudon et al. | |
| 2012/0278354 A1 | 11/2012 | Yan et al. | |
| 2013/0024423 A1 | 1/2013 | Doshi et al. | |
| 2013/0054635 A1 | 2/2013 | Phelps et al. | |
| 2013/0080538 A1 | 3/2013 | McEachern et al. | |
| 2013/0082848 A1 | 4/2013 | Marjanen et al. | |
| 2013/0227352 A1 | 8/2013 | Kumarasamy et al. | |
| 2013/0317944 A1 | 11/2013 | Huang et al. | |
| 2013/0332685 A1 | 12/2013 | Kripalani et al. | |
| 2013/0335785 A1 | 12/2013 | Qi et al. | |
| 2014/0025796 A1 | 1/2014 | Vibhor et al. | |
| 2014/0074793 A1 | 3/2014 | Doering et al. | |
| 2014/0137246 A1 | 5/2014 | Baluda et al. | |
| 2014/0201170 A1 | 7/2014 | Vijayan et al. | |
| 2014/0201485 A1 | 7/2014 | Ahn et al. | |
| 2014/0270159 A1 | 9/2014 | Youn et al. | |
| 2014/0298112 A1 | 10/2014 | Otsuka et al. | |
| 2014/0344234 A1* | 11/2014 | Amarendran | G06F 16/21 707/694 |
| 2015/0163206 A1 | 6/2015 | McCarthy et al. | |
| 2015/0172120 A1 | 6/2015 | Dwarampudi et al. | |
| 2015/0213484 A1 | 7/2015 | Amara | |
| 2015/0236896 A1 | 8/2015 | Brown et al. | |
| 2015/0242483 A1 | 8/2015 | Zhou et al. | |
| 2016/0004882 A1 | 1/2016 | Ballai et al. | |
| 2016/0078245 A1 | 3/2016 | Amarendran et al. | |
| 2016/0292263 A1 | 10/2016 | Ferrar | |
| 2016/0299934 A1 | 10/2016 | Karandikar et al. | |
| 2016/0350391 A1 | 12/2016 | Vijayan et al. | |
| 2017/0155674 A1* | 6/2017 | Seo | G06F 11/34 |
| 2017/0168903 A1 | 6/2017 | Dornemann et al. | |
| 2017/0185488 A1 | 6/2017 | Kumarasamy et al. | |
| 2017/0192866 A1 | 7/2017 | Vijayan et al. | |
| 2017/0192868 A1 | 7/2017 | Vijayan et al. | |
| 2017/0193003 A1 | 7/2017 | Vijayan et al. | |
| 2017/0223031 A1* | 8/2017 | Gu | G06F 11/1448 |
| 2017/0235647 A1 | 8/2017 | Kilaru et al. | |
| 2017/0242871 A1 | 8/2017 | Kilaru et al. | |
| 2017/0269955 A1 | 9/2017 | Hardy | |
| 2017/0277774 A1 | 9/2017 | Eigner et al. | |
| 2017/0279720 A1 | 9/2017 | Patnaik et al. | |
| 2017/0279832 A1 | 9/2017 | Di Pietro et al. | |
| 2017/0364681 A1* | 12/2017 | Roguine | G06F 21/554 |
| 2018/0007069 A1* | 1/2018 | Hunt | H04L 63/1408 |
| 2018/0018458 A1 | 1/2018 | Schmugar et al. | |
| 2018/0204000 A1 | 7/2018 | Charters et al. | |
| 2018/0253358 A1 | 9/2018 | Gu | |
| 2019/0075130 A1 | 3/2019 | Petry et al. | |
| 2019/0095304 A1 | 3/2019 | Kumarasamy et al. | |
| 2019/0108340 A1 | 4/2019 | Bedhapudi et al. | |
| 2019/0108341 A1 | 4/2019 | Bedhapudi et al. | |
| 2019/0109870 A1 | 4/2019 | Bedhapudi et al. | |
| 2019/0138727 A1 | 5/2019 | Dontov et al. | |
| 2019/0205317 A1 | 7/2019 | Tobias et al. | |
| 2019/0228147 A1 | 7/2019 | Formato et al. | |
| 2019/0347415 A1 | 11/2019 | Yavo | |
| 2020/0089876 A1 | 3/2020 | Aharoni et al. | |
| 2020/0159624 A1 | 5/2020 | Malkov et al. | |
| 2020/0244672 A1 | 7/2020 | Grill et al. | |
| 2020/0272549 A1 | 8/2020 | Kumarasamy et al. | |
| 2020/0320215 A1 | 10/2020 | Bhosale et al. | |
| 2020/0349133 A1 | 11/2020 | Dwarampudi et al. | |
| 2021/0049075 A1 | 2/2021 | Gibbons, Jr. et al. | |
| 2021/0117377 A1 | 4/2021 | Savir et al. | |
| 2021/0218551 A1 | 7/2021 | Moriarty et al. | |
| 2021/0271758 A1 | 9/2021 | Bedhapudi et al. | |
| 2021/0349748 A1 | 11/2021 | Dunfey et al. | |
| 2022/0019385 A1 | 1/2022 | Karr et al. | |
| 2022/0292195 A1 | 9/2022 | Holland | |
| 2022/0292196 A1 | 9/2022 | Bhagi et al. | |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 9513580 | 5/1995 |
| WO | WO 9912098 | 3/1999 |
| WO | WO 2006/052872 | 11/2005 |

OTHER PUBLICATIONS

Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.

Arneson, "Mass Storage Archiving in Network Environments" IEEE, Oct. 31-Nov. 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

(56) References Cited

OTHER PUBLICATIONS

Eitel, "Backup and Storage Management in Distributed Heterogeneous Environments," IEEE, 1994, pp. 124-126.

Hossain et al., "Combating Dependence Explosion in Forensic Analysis", 2020 IEEE Symposium, May 1, 2020.

Huff, KL, "Data Set Usage Sequence Number," IBM Technical Disclosure Bulletin, vol. 24, No. 5, Oct. 1981 New York, US, pp. 2404-2406.

Nagappan et al., Abstracting Log Lines to Log Event Types for Mining Software System Logs, Working Conference on Mining Software Repositories (MSR), May 2010, 7th IEEE, 6 pages.

NPL History Search (Year: 2023).

NPL History Search (Year: 2024).

Rosenblum et al., "The Design and Implementation of a Log-Structure File System," Operating Systems Review SIGOPS, vol. 25, No. 5, May 1991, New York, US, pp. 1-15.

Shingomiker et al., "Proactive Early Threat Detection and Securing Oracle Database", Mar. 10, 2023.

* cited by examiner

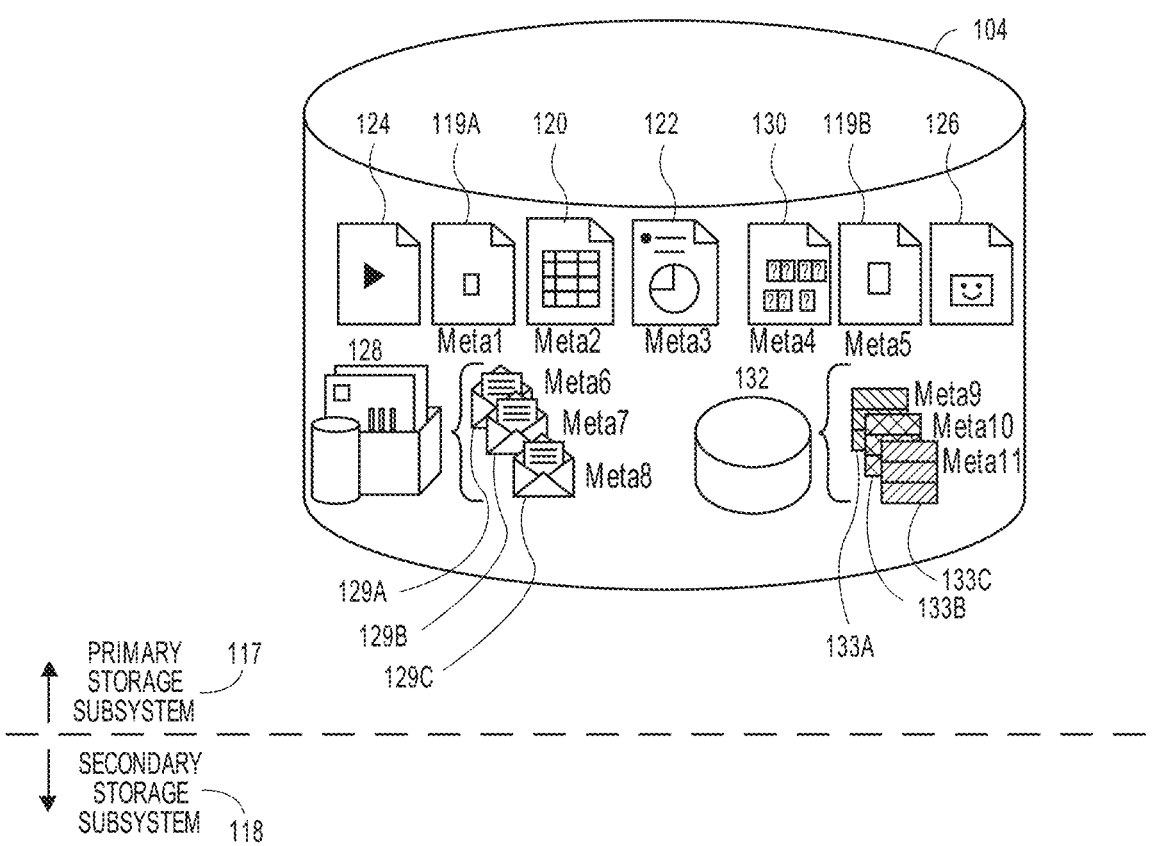
PRIMARY STORAGE SUBSYSTEM 117
SECONDARY STORAGE SUBSYSTEM 118
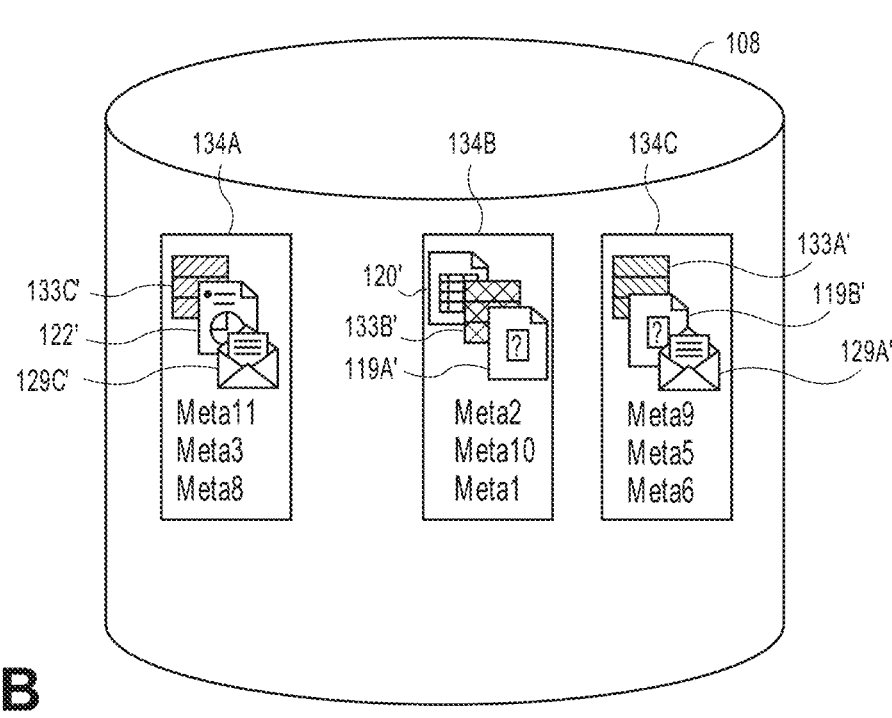
FIG. 1B

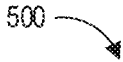
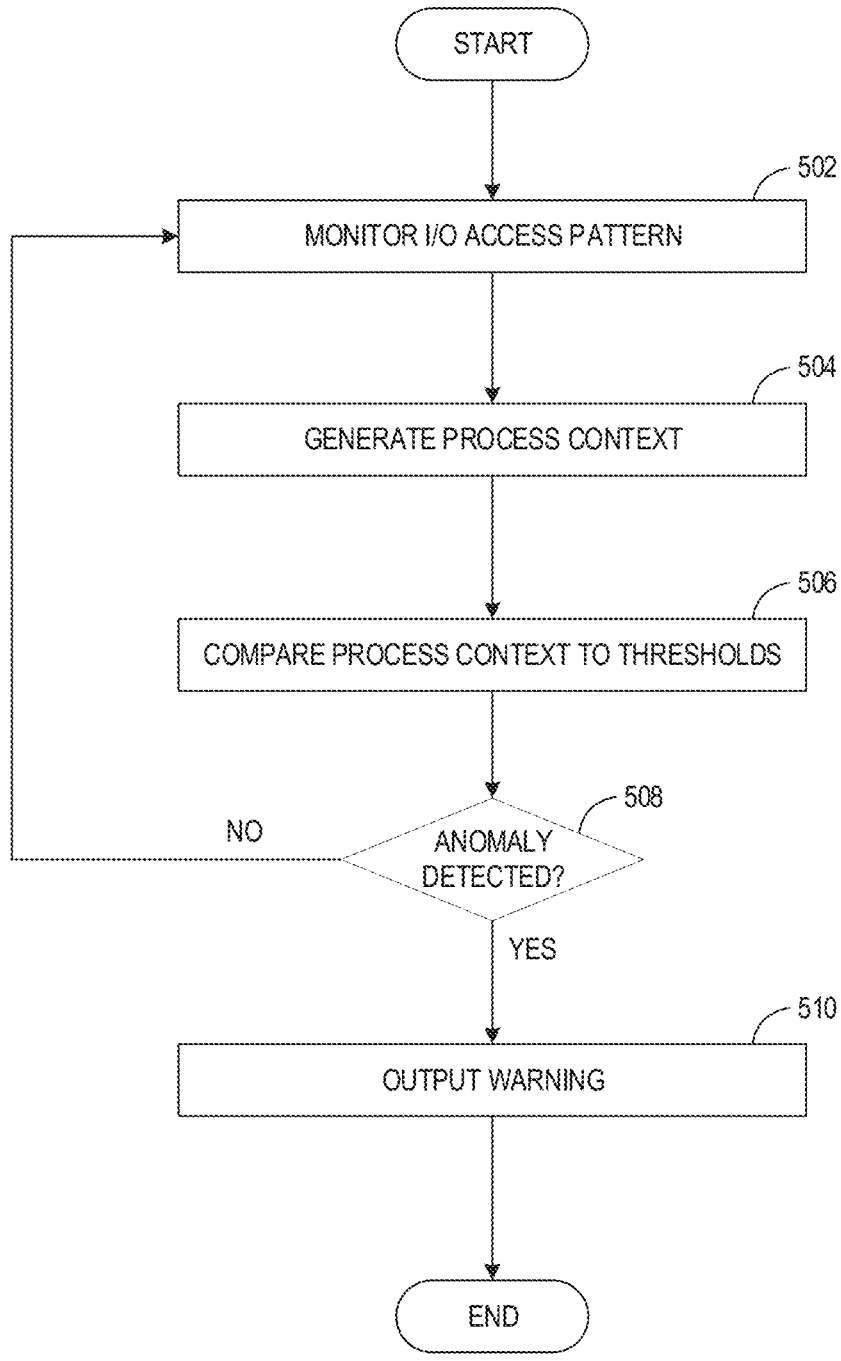
REAL-TIME APPROACH FOR RANSOMWARE DETECTION
START
502
MONITOR I/O ACCESS PATTERN
504
GENERATE PROCESS CONTEXT
506
COMPARE PROCESS CONTEXT TO THRESHOLDS
508
ANOMALY DETECTED?
NO
YES
510
OUTPUT WARNING
END
FIG. 5

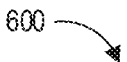
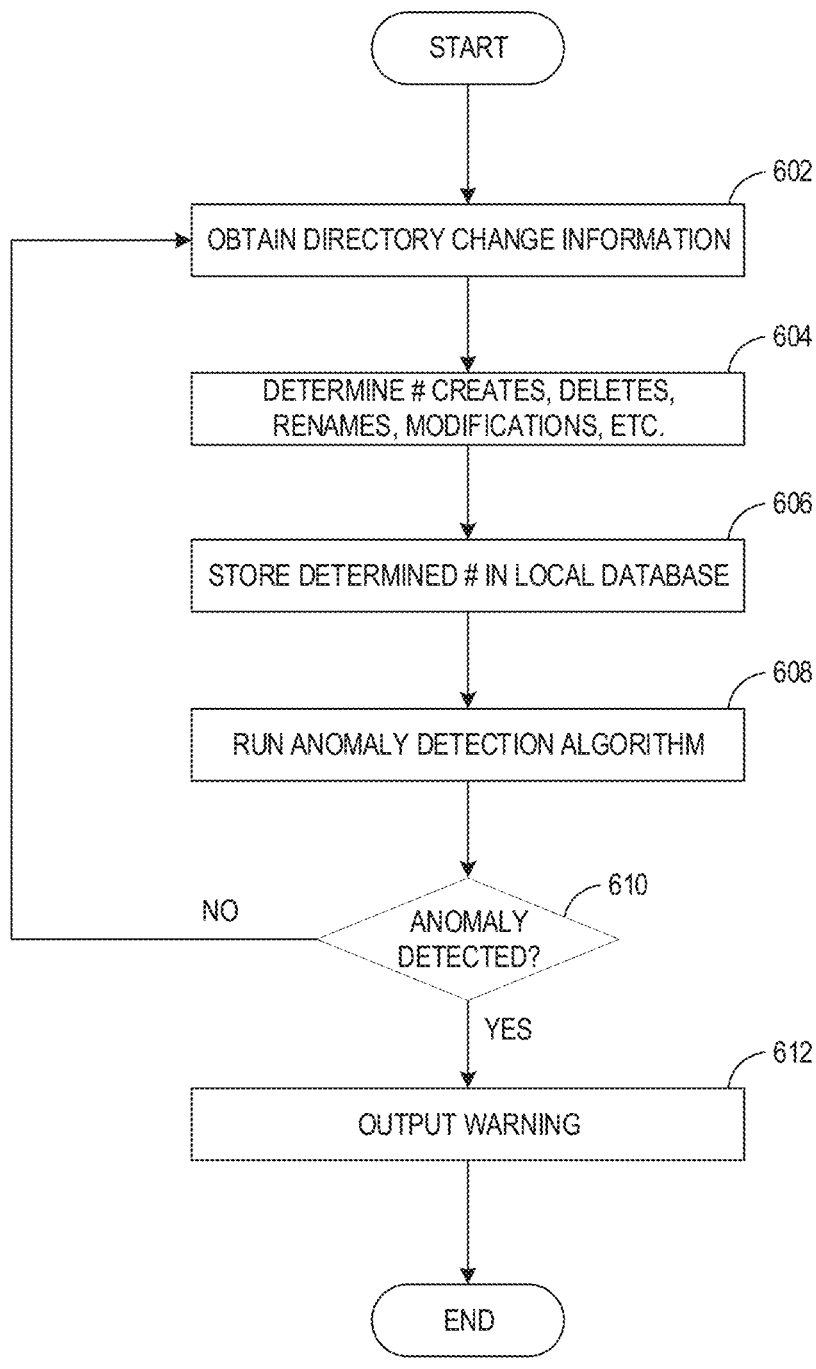
DIRECTORY CHANGE CALLBACK APPROACH FOR RANSOMWARE DETECTION
START
602 OBTAIN DIRECTORY CHANGE INFORMATION
604 DETERMINE # CREATES, DELETES, RENAMES, MODIFICATIONS, ETC.
606 STORE DETERMINED # IN LOCAL DATABASE
608 RUN ANOMALY DETECTION ALGORITHM
610 ANOMALY DETECTED?
NO
YES
612 OUTPUT WARNING
END
FIG. 6

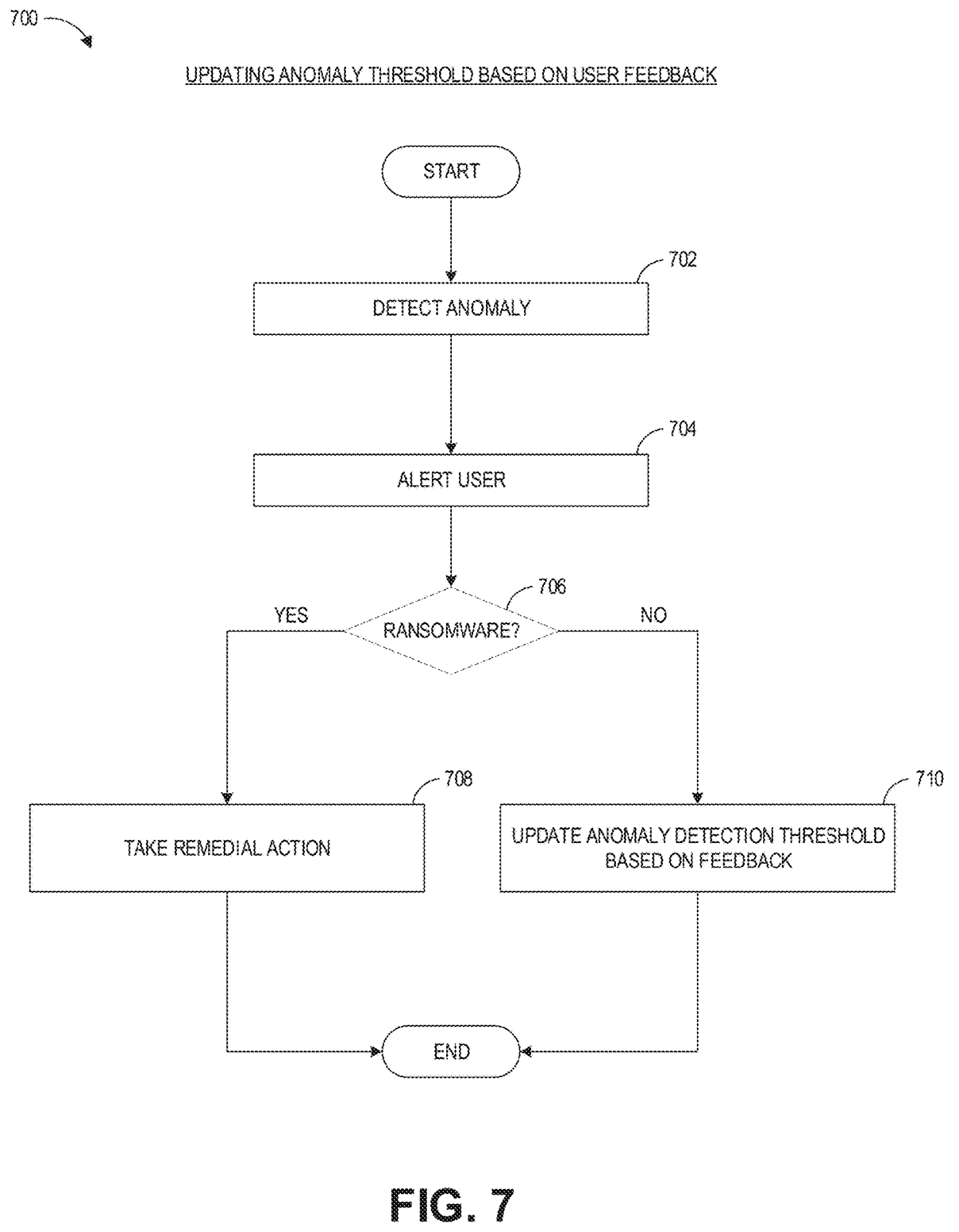

700

UPDATING ANOMALY THRESHOLD BASED ON USER FEEDBACK

START

DETECT ANOMALY 702

ALERT USER 704

RANSOMWARE? 706

YES

NO

TAKE REMEDIAL ACTION 708

UPDATE ANOMALY DETECTION THRESHOLD BASED ON FEEDBACK 710

END

FIG. 7

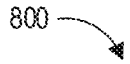
DISABLING AND ENABLING DATA AGENT BASED ON USER FEEDBACK
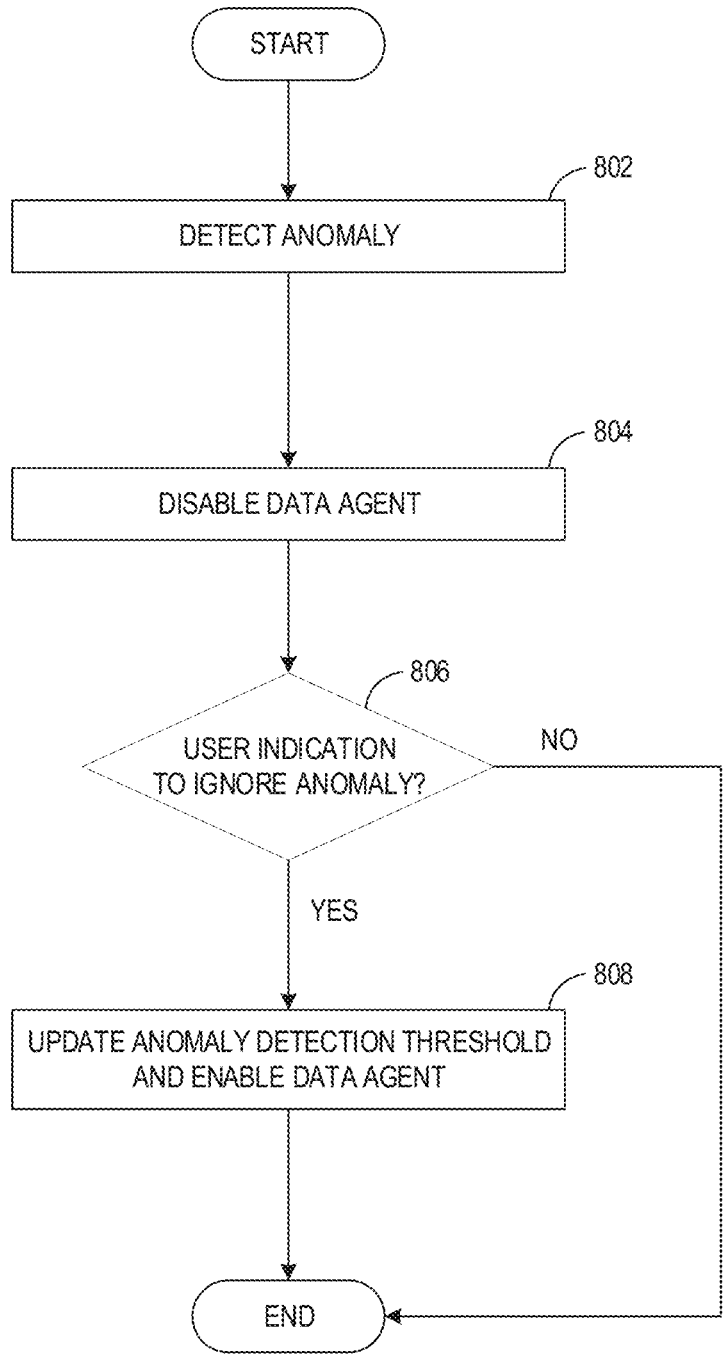
FIG. 8

900 —

DISABLING AND ENABLING PRUNING BASED ON USER FEEDBACK

START

CREATE BACKUP — 902

PRUNE PRIOR BACKUP — 904

ANOMALY? — 906

NO

YES

DISABLE PRUNING — 908

USER INDICATION TO IGNORE ANOMALY? — 910

YES → UPDATE ANOMALY THRESHOLD AND ENABLE PRUNING — 912

NO

TAKE FURTHER REMEDIAL ACTION — 914

END

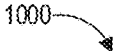
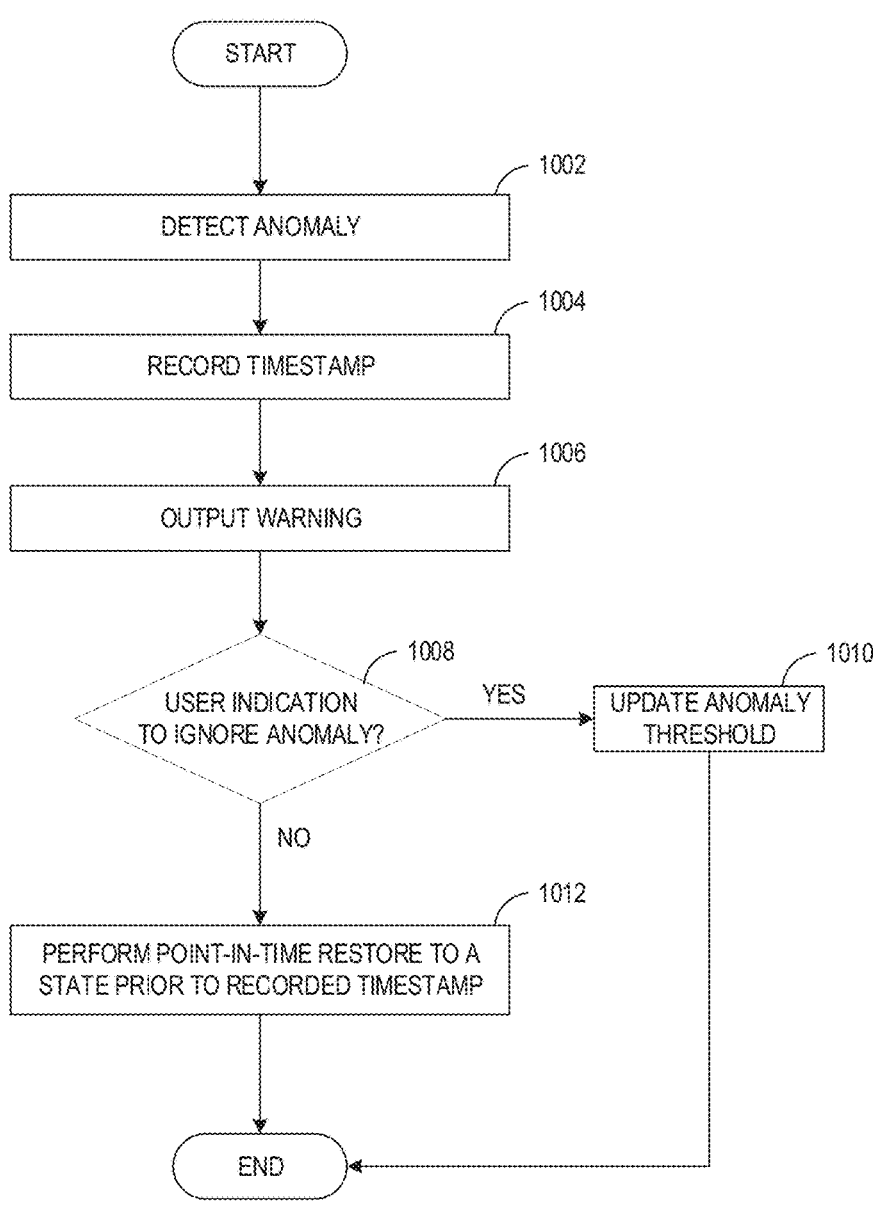
AUTOMATED POINT-IN-TIME RESTORE
FIG. 10

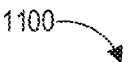
RANSOMWARE DETECTION ON A CENTRAL SERVER
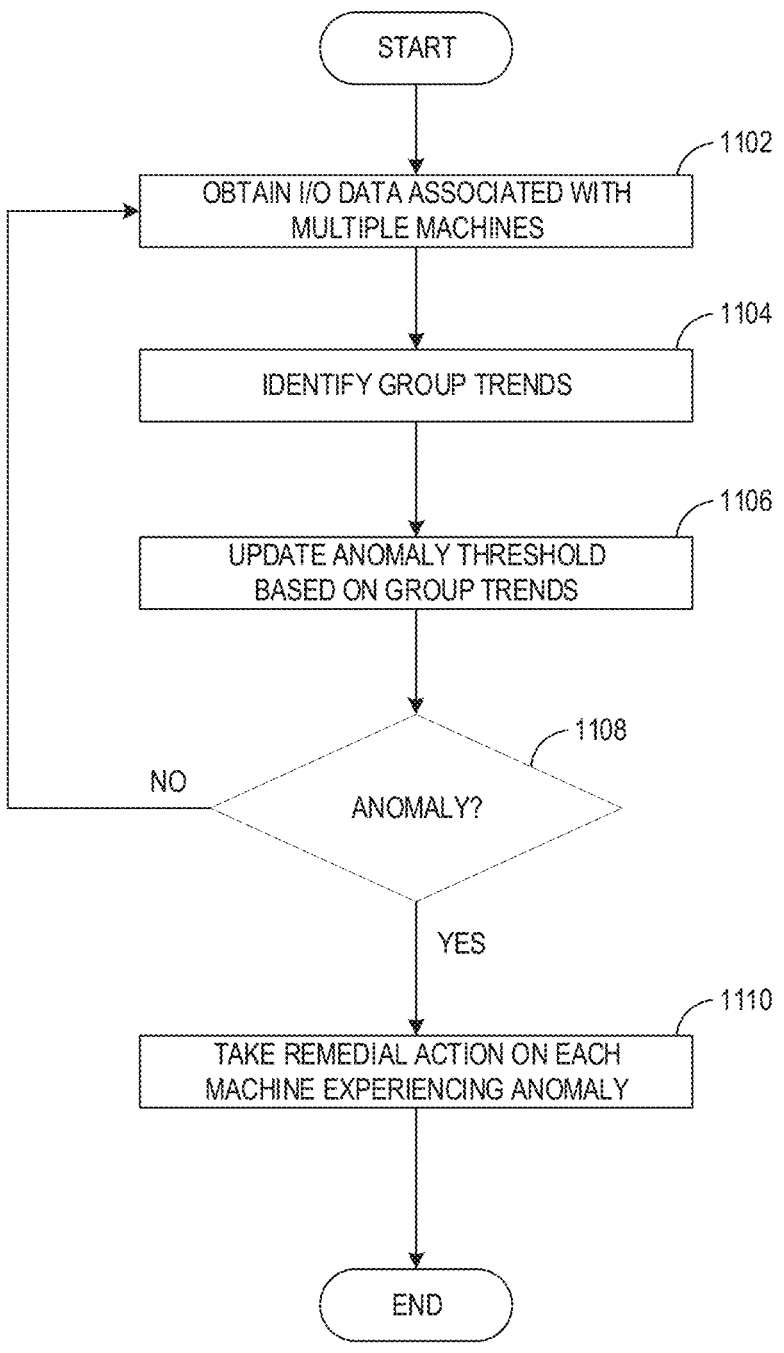
FIG. 11

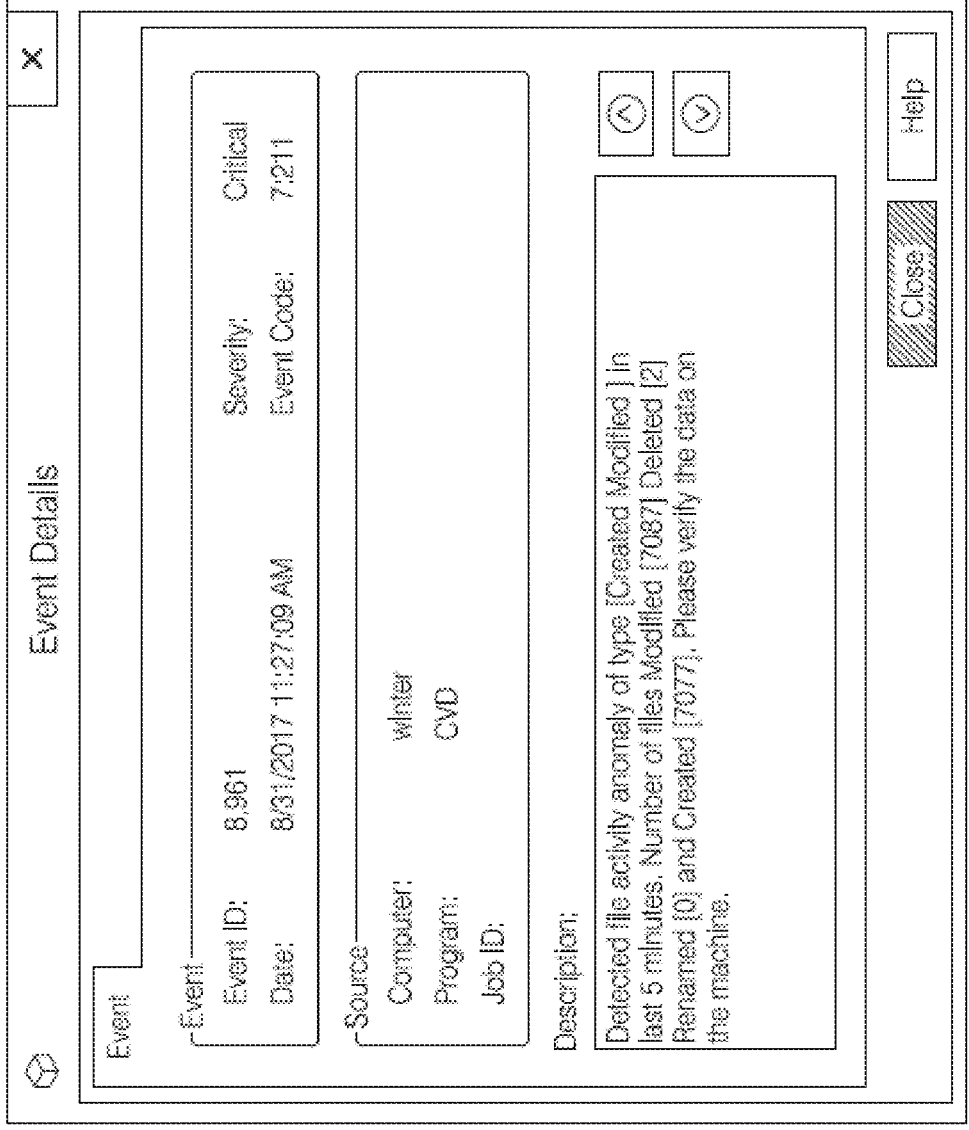
FIG. 12

Figure 14:
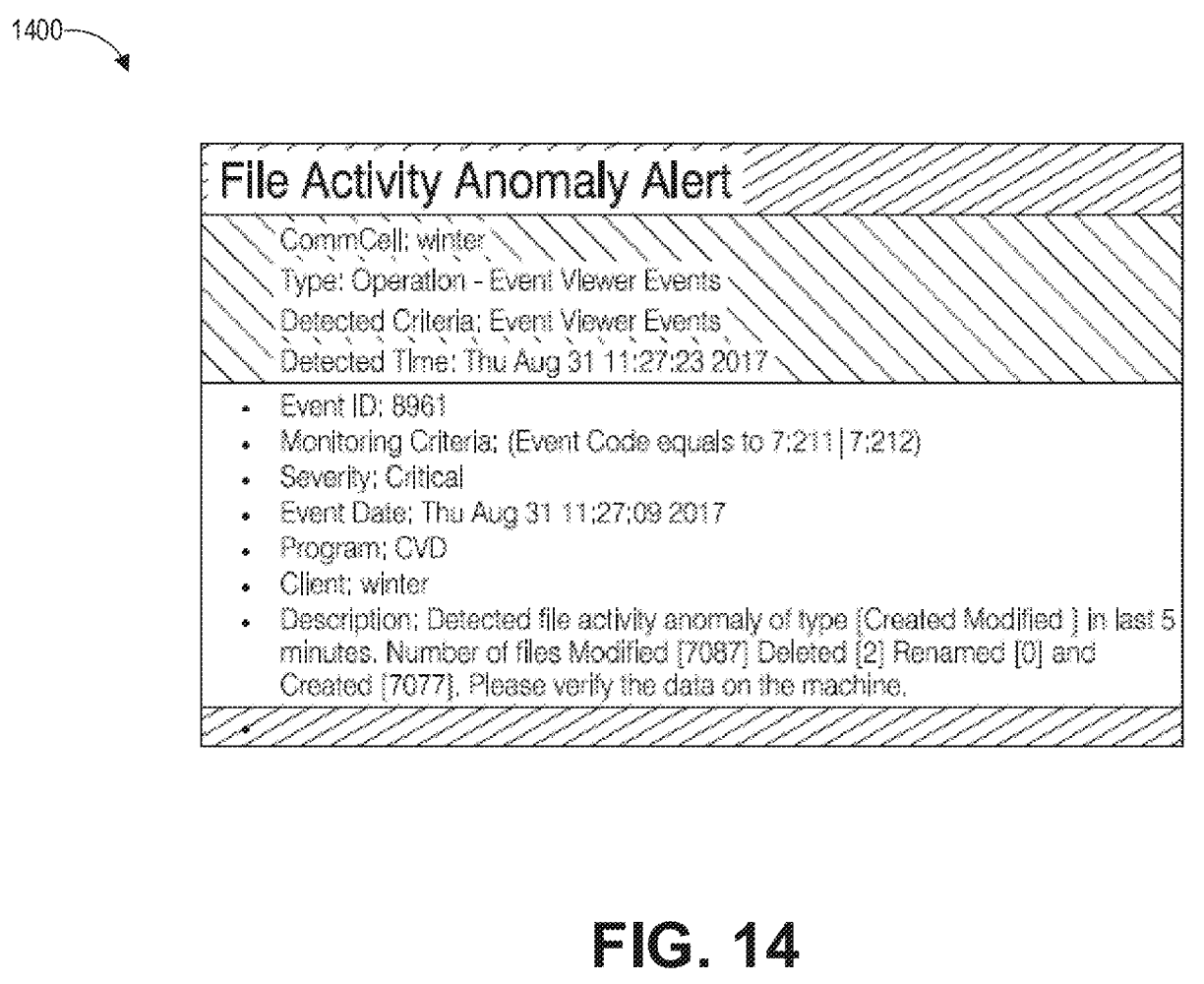

File Activity Anomaly Alert

CommCell: winter
Type: Operation – Event Viewer Events

Detected Criteria: Event Viewer Events
Detected Time: Thu Aug 31 11:27:23 2017

- Event ID: 8961
- Monitoring Criteria: (Event Code equals to 7:211|7:212)
- Severity: Critical
- Event Date: Thu Aug 31 11:27:03 2017
- Program: CVD
- Client: winter
- Description: Detected file activity anomaly of type [Created Modified ] in last 5 minutes. Number of files Modified [7087] Deleted [2] Renamed [0] and Created [7077]. Please verify the data on the machine.

RANSOMWARE DETECTION AND DATA PRUNING MANAGEMENT

RELATED APPLICATIONS

This application a continuation of U.S. patent application Ser. No. 17/173,816, filed on Feb. 11, 2021 and titled "RANSOMWARE DETECTION AND DATA PRUNING MANAGEMENT," which is a continuation of U.S. patent application Ser. No. 16/129,623, filed on Sep. 12, 2018 and titled "RANSOMWARE DETECTION AND DATA PRUNING MANAGEMENT," which claims the benefit of U.S. Provisional Patent Application No. 62/558,752, filed on Sep. 14, 2017 and titled "RANSOMWARE DETECTION AND DATA PRUNING MANAGEMENT." Any and all applications, if any, for which a foreign or domestic priority claim is identified in the Application Data Sheet of the present application are hereby incorporated by reference in their entireties under 37 CFR 1.57.

COPYRIGHT NOTICE

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

SUMMARY

Certain embodiments described herein relate to automated ransomware detection. Ransomware is a specific type of malware that enters a file system by exploiting vulnerabilities within the file system. Ransomware typically encrypts a user's files and leaves a ransom note for the user, inviting the user to pay a sum of money in exchange for a decryption key that can be used to decrypt the user's files. Ransomware typically involves an input/output (I/O) heavy process of encrypting data files and/or deleting or renaming the original files. Thus, ransomware attacks may be detected by analyzing the I/O activity in the file system. In some embodiments, a software module running on a client machine monitors the I/O activity in the file system. The software module records the number of times the files in the file system are modified, created, deleted, and/or renamed. The recorded number is compared against a threshold. If the number exceeds the threshold, the software module provides an alert to the user of the client machine that the client machine may be under a ransomware attack. In some embodiments, index data gathered as part of backup operations is utilized, either alone or in combination with the continuously monitored I/O activity data, to detect ransomware attacks.

As further described below, a data agent (e.g., a software program executing on the client machine) is responsible for managing, initiating, or otherwise assisting in the performance of copying, archiving, migrating, and/or replicating of primary data and restoring and/or pruning secondary data (e.g., backup copies of the primary data). When a potential ransomware attack is detected, the data agent running on the client machine is immediately stopped so that the data agent does not prune any data that may need to be restored. Upon receiving user input that indicates that the client machine is not under a ransomware attack, the data agent is allowed to resume its operations, including pruning of the secondary data.

In addition, when a potential ransomware attack is detected, a timestamp is recorded. If the client machine is indeed taken over by the ransomware attack, an intelligent restore operation can be performed such that the primary data is automatically restored to a point in time prior to the infection by the ransomware attack using the recorded timestamp.

BRIEF DESCRIPTION OF THE DRAWINGS

FIG. 1B is a detailed view of a primary storage device, a secondary storage device, and some examples of primary data and secondary copy data.

FIG. 5 depicts some salient operations of a method 500 according to an illustrative embodiment of the present invention.

FIG. 6 depicts some salient operations of a method 600 according to an illustrative embodiment of the present invention.

FIG. 7 depicts some salient operations of a method 700 according to an illustrative embodiment of the present invention.

FIG. 8 depicts some salient operations of a method 800 according to an illustrative embodiment of the present invention.

FIG. 10 depicts some salient operations of a method 1000 according to an illustrative embodiment of the present invention.

FIG. 11 depicts some salient operations of a method 1100 according to an illustrative embodiment of the present invention.

FIG. 12 depicts an illustrative graphical user interface showing detection of file activity anomaly in the illustrative system.

FIG. 14 depicts an illustrative graphical user interface showing a file activity anomaly alert in the illustrative system.

FIG. 16 depicts an illustrative graphical user interface showing clearing of detected file activity anomalies in the illustrative system.

DETAILED DESCRIPTION

Detailed descriptions and examples of systems and methods according to one or more illustrative embodiments of the present invention may be found in the sections below, beginning with the section entitled Introduction to Ransomware through the section entitled Example Embodiments, and also in FIGS. 3A-20 herein. Furthermore, components and functionality for automated ransomware detection may be configured and/or incorporated into information management systems such as those described herein in FIGS. 1A-1H and 2A-2C.

Various embodiments described herein are intimately tied to, enabled by, and would not exist except for, computer technology. For example, automated ransomware detection described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
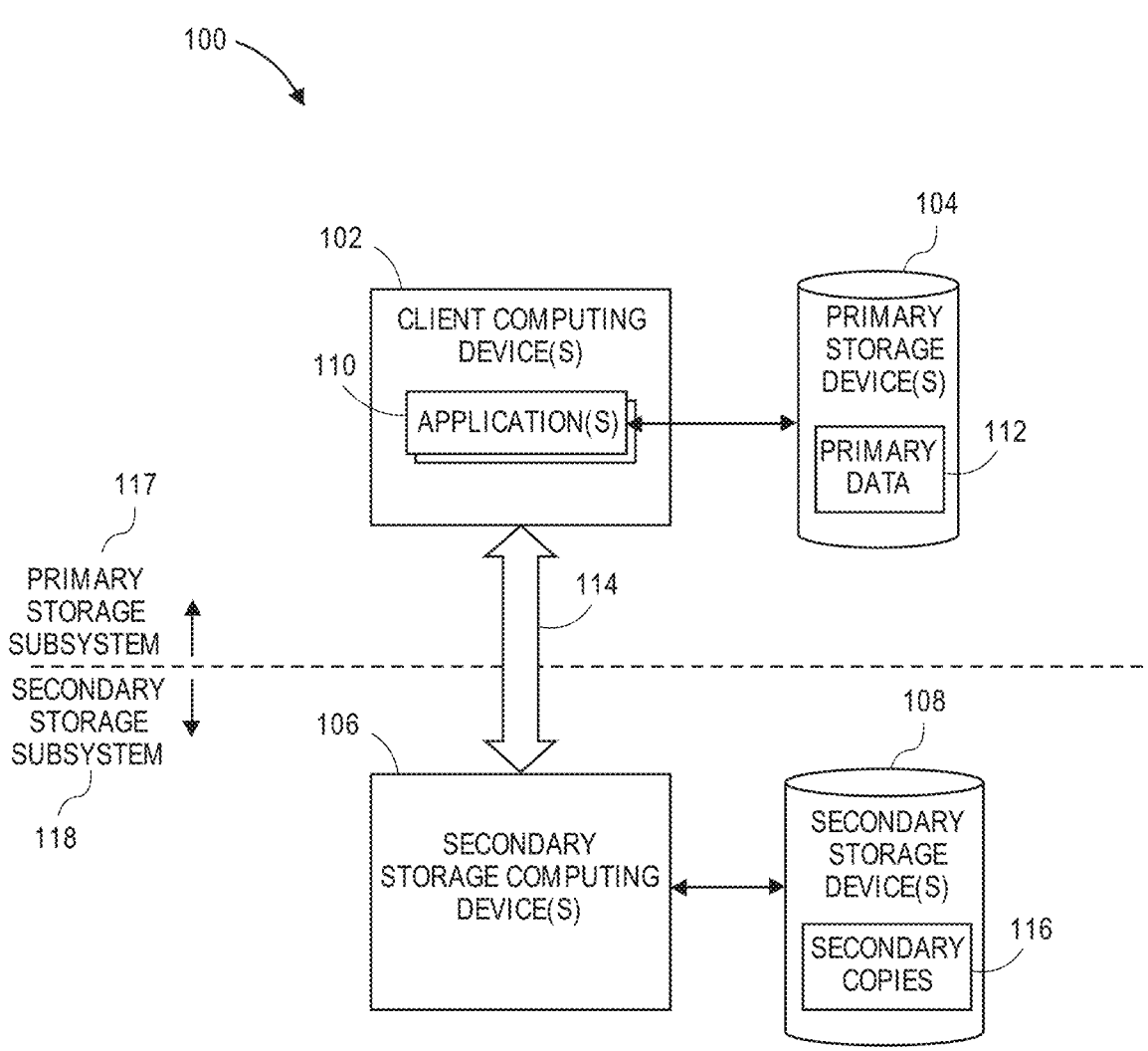
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. patent application Ser. No. 14/721,971, entitled "Replication Using Deduplicated Secondary Copy Data" (applicant docket no. 100.422.US1.145;

U.S. Patent Application No. 62/265,339 entitled "Live Synchronization and Management of Virtual Machines across Computing and Virtualization Platforms and Using Live Synchronization to Support Disaster Recovery" (applicant docket no. 100.487.USP1.160;

U.S. Patent Application No. 62/273,286 entitled "Redundant and Robust Distributed Deduplication Data Storage System" (applicant docket no. 100.489.USP1.135;

U.S. Patent Application No. 62/294,920, entitled "Data Protection Operations Based on Network Path Information" (applicant docket no. 100.497.USP1.105;

U.S. Patent Application No. 62/297,057, entitled "Data Restoration Operations Based on Network Path Information" (applicant docket no. 100.498.USP1.105; and U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others" (applicant docket no. 100.500.USP1.105.

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, California; Microsoft Virtual Server and Microsoft Windows Server Hyper-V, both by Microsoft Corporation of Redmond, Washington; Sun xVM by Oracle America Inc. of Santa Clara, California; and Xen by Citrix Systems, Santa Clara, California. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
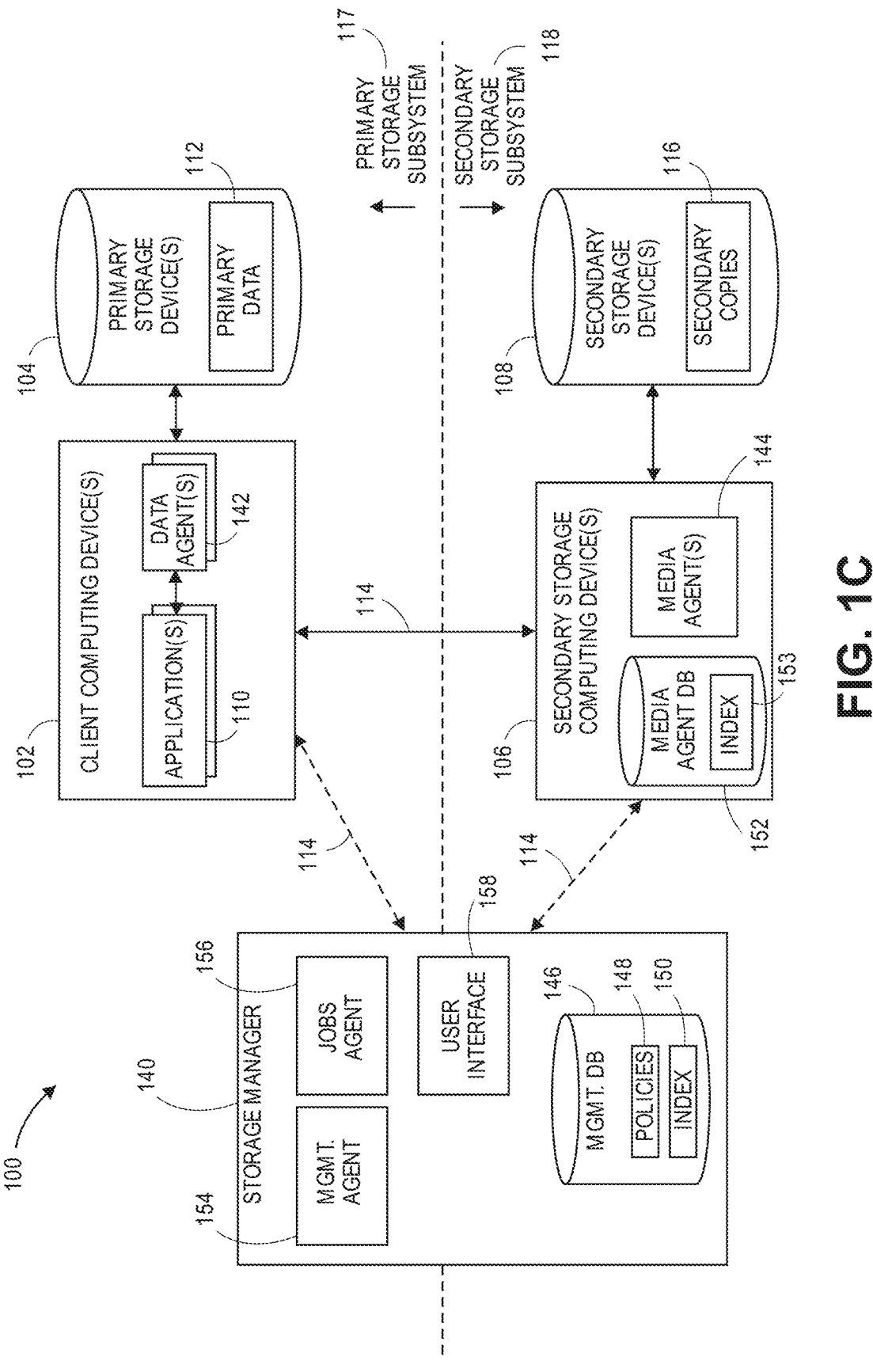
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, IOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/ or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;

initiating execution of information management operations;

initiating restore and recovery operations;

managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents.

Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
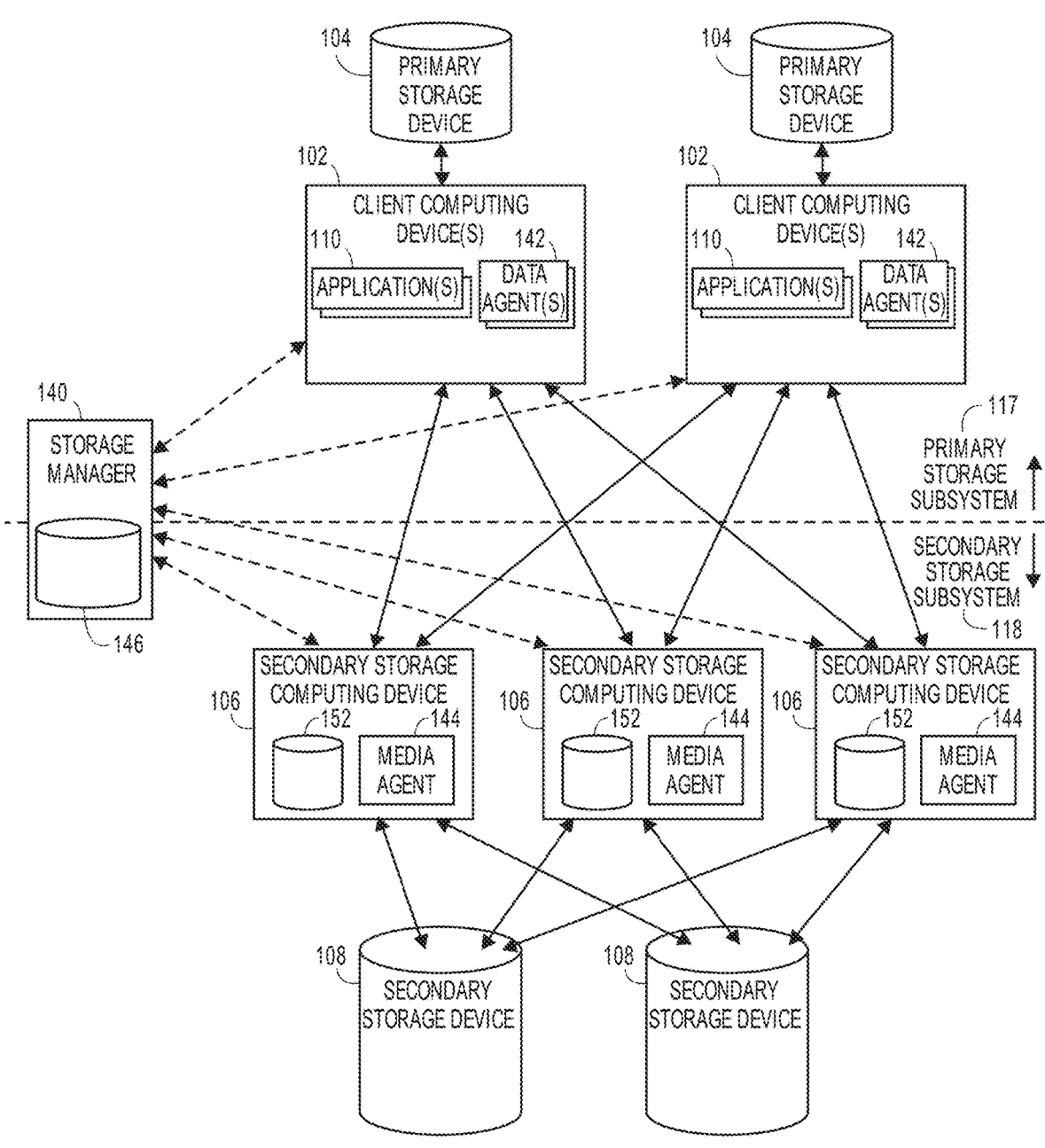
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy (ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth alloca-
tion, available storage capacity, etc.);

whether and how to synchronize or otherwise distribute
files or other data objects across multiple computing
devices or hosted services; and retention information specifying the length of time pri-
mary data 112 and/or secondary copies 116 should be
retained, e.g., in a particular class or tier of storage
devices, or within the system 100.

Information management policies 148 can additionally
specify or depend on historical or current criteria that may
be used to determine which rules to apply to a particular data
object, system component, or information management
operation, such as:

frequency with which primary data 112 or a secondary
copy 116 of a data object or metadata has been or is
predicted to be used, accessed, or modified;

time-related factors (e.g., aging information such as time
since the creation or modification of a data object);

deduplication information (e.g., hashes, data blocks,
deduplication block size, deduplication efficiency or
other metrics);

an estimated or historic usage or cost associated with
different components (e.g., with secondary storage
devices 108);

the identity of users, applications 110, client computing
devices 102 and/or other computing devices that cre-
ated, accessed, modified, or otherwise utilized primary
data 112 or secondary copies 116;

a relative sensitivity (e.g., confidentiality, importance) of
a data object, e.g., as determined by its content and/or
metadata;

the current or historical storage capacity of various stor-
age devices;

the current or historical network capacity of network
pathways connecting various components within the
storage operation cell;

access control lists or other security information; and the content of a particular data object (e.g., its textual
content) or of metadata associated with the data object.

Exemplary Storage Policy and Secondary Copy Operations

Figure 1E:
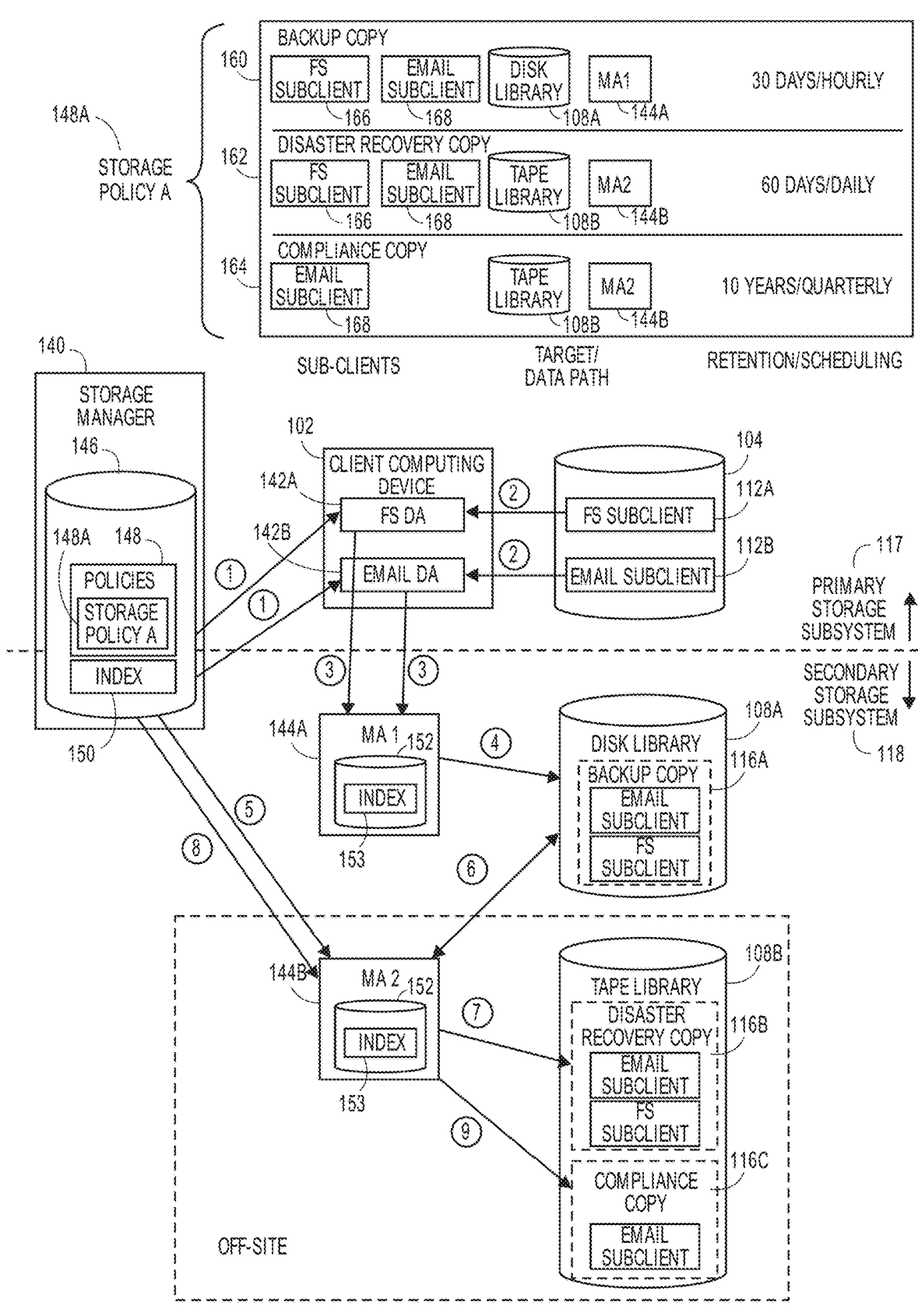
FIG. 1E illustrates certain secondary copy operations according to an exemplary storage policy.

FIG. 1E includes a data flow diagram depicting perfor-
mance of secondary copy operations by an embodiment of
information management system 100, according to an exem-
plary storage policy 148A. System 100 includes a storage
manager 140, a client computing device 102 having a file
system data agent 142A and an email data agent 142B
operating thereon, a primary storage device 104, two media
agents 144A, 144B, and two secondary storage devices 108:
a disk library 108A and a tape library 108B. As shown,
primary storage device 104 includes primary data 112A,
which is associated with a logical grouping of data associ-
ated with a file system ("file system subclient"), and primary
data 112B, which is a logical grouping of data associated
with email ("email subclient"). The techniques described
with respect to FIG. 1E can be utilized in conjunction with
data that is otherwise organized as well.

As indicated by the dashed box, the second media agent
144B and tape library 108B are "off-site," and may be
remotely located from the other components in system 100
(e.g., in a different city, office building, etc.). Indeed, "off-
site" may refer to a magnetic tape located in remote storage,
which must be manually retrieved and loaded into a tape
drive to be read. In this manner, information stored on the
tape library 108B may provide protection in the event of a
disaster or other failure at the main site(s) where data is
stored.

The file system subclient 112A in certain embodiments
generally comprises information generated by the file sys-
tem and/or operating system of client computing device 102,
and can include, for example, file system data (e.g., regular
files, file tables, mount points, etc.), operating system data
(e.g., registries, event logs, etc.), and the like. The e-mail
subclient 112B can include data generated by an e-mail
application operating on client computing device 102, e.g.,
mailbox information, folder information, emails, attach-
ments, associated database information, and the like. As
described above, the subclients can be logical containers,
and the data included in the corresponding primary data
112A and 112B may or may not be stored contiguously.

The exemplary storage policy 148A includes backup copy
preferences or rule set 160, disaster recovery copy prefer-
ences or rule set 162, and compliance copy preferences or
rule set 164. Backup copy rule set 160 specifies that it is
associated with file system subclient 166 and email subclient
168. Each of subclients 166 and 168 are associated with the
particular client computing device 102. Backup copy rule set
160 further specifies that the backup operation will be
written to disk library 108A and designates a particular
media agent 144A to convey the data to disk library 108A.
Finally, backup copy rule set 160 specifies that backup
copies created according to rule set 160 are scheduled to be
generated hourly and are to be retained for 30 days. In some
other embodiments, scheduling information is not included
in storage policy 148A and is instead specified by a separate
scheduling policy.

Disaster recovery copy rule set 162 is associated with the
same two subclients 166 and 168. However, disaster recov-
ery copy rule set 162 is associated with tape library 108B,
unlike backup copy rule set 160. Moreover, disaster recov-
ery copy rule set 162 specifies that a different media agent,
namely 144B, will convey data to tape library 108B. Disas-
ter recovery copies created according to rule set 162 will be
retained for 60 days and will be generated daily. Disaster
recovery copies generated according to disaster recovery
copy rule set 162 can provide protection in the event of a
disaster or other catastrophic data loss that would affect the
backup copy 116A maintained on disk library 108A.

Compliance copy rule set 164 is only associated with the
email subclient 168, and not the file system subclient 166.
Compliance copies generated according to compliance copy
rule set 164 will therefore not include primary data 112A
from the file system subclient 166. For instance, the orga-
nization may be under an obligation to store and maintain
copies of email data for a particular period of time (e.g., 10
years) to comply with state or federal regulations, while
similar regulations do not apply to file system data. Com-
pliance copy rule set 164 is associated with the same tape
library 108B and media agent 144B as disaster recovery
copy rule set 162, although a different storage device or
media agent could be used in other embodiments. Finally,
compliance copy rule set 164 specifies that the copies it
governs will be generated quarterly and retained for 10
years.

Secondary Copy Jobs

A logical grouping of secondary copy operations gov-
erned by a rule set and being initiated at a point in time may
be referred to as a "secondary copy job" (and sometimes
may be called a "backup job," even though it is not neces-
sarily limited to creating only backup copies). Secondary
copy jobs may be initiated on demand as well. Steps 1-9
below illustrate three secondary copy jobs based on storage
policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578, 120.

Figures 1F, 1G:
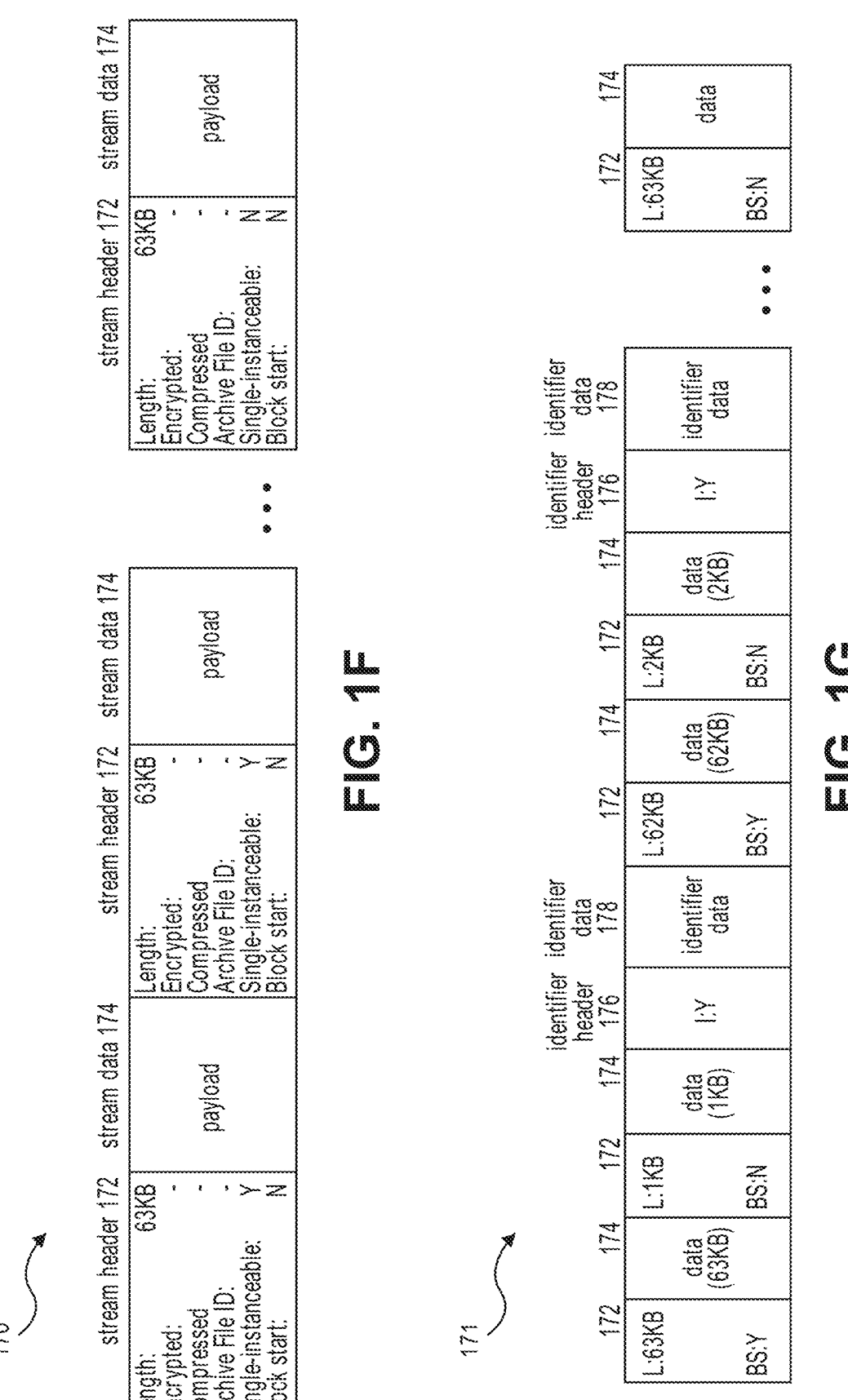
FIGS. 1F-1H are block diagrams illustrating suitable data structures that may be employed by the information management system.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
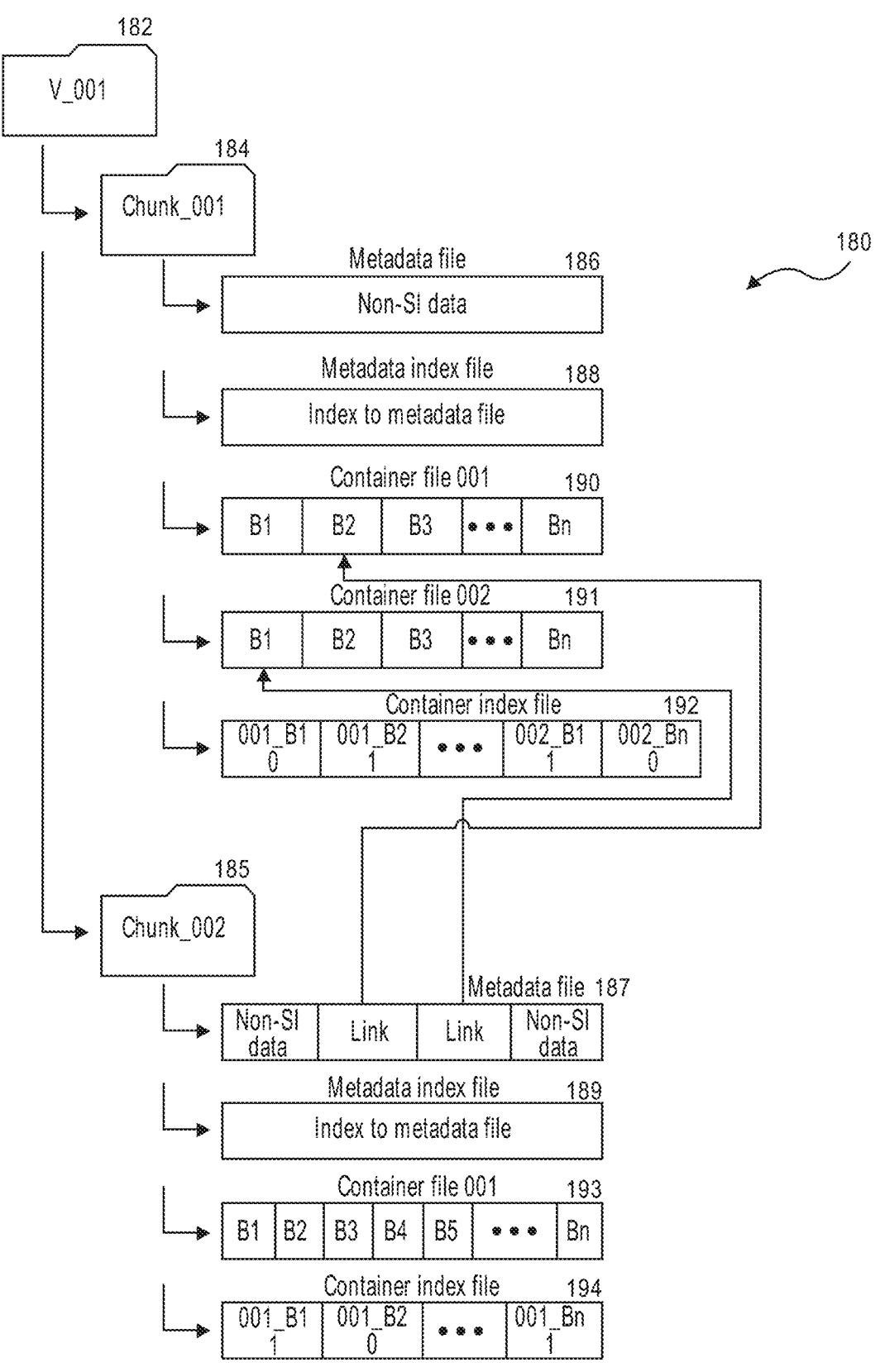

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
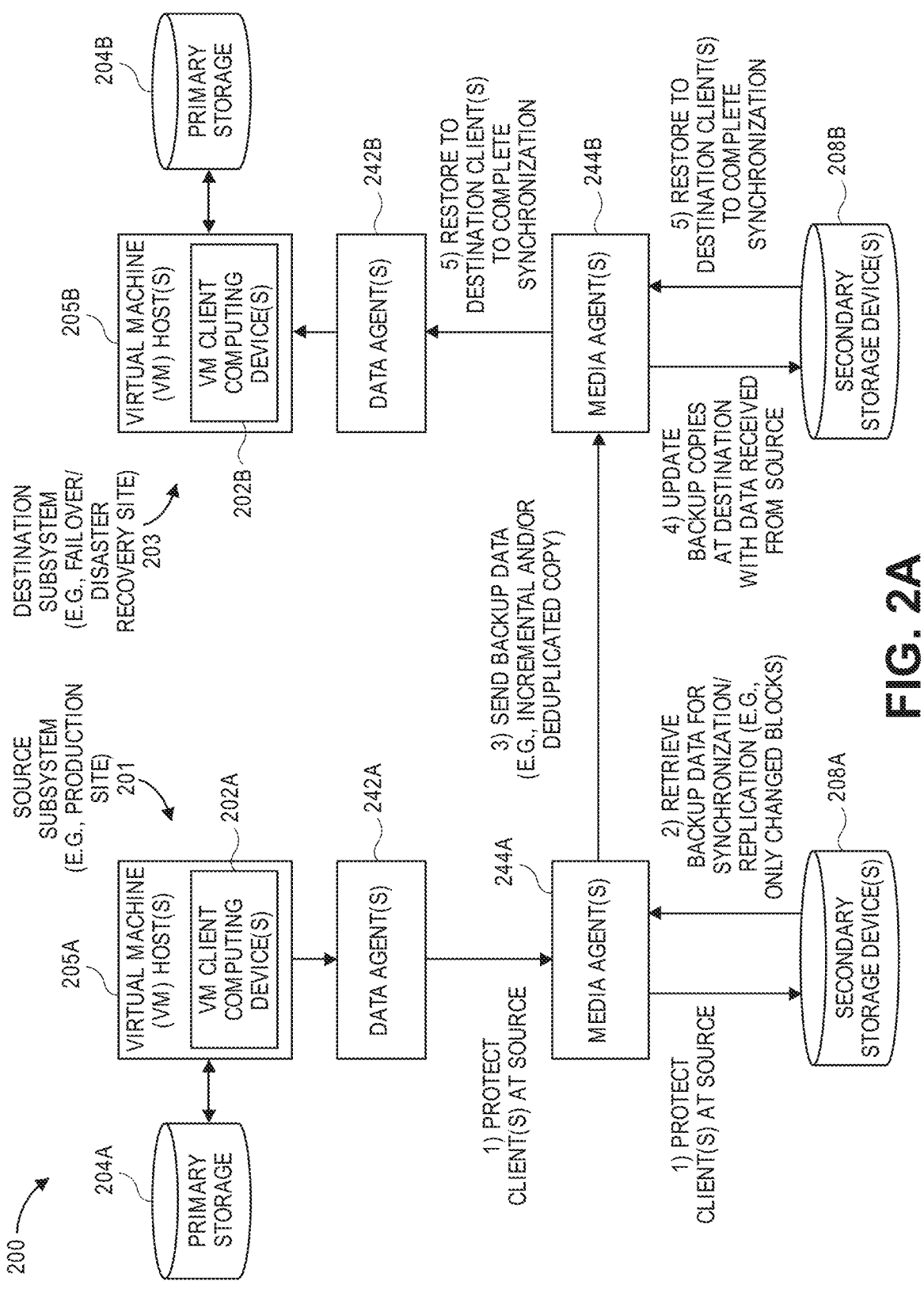
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
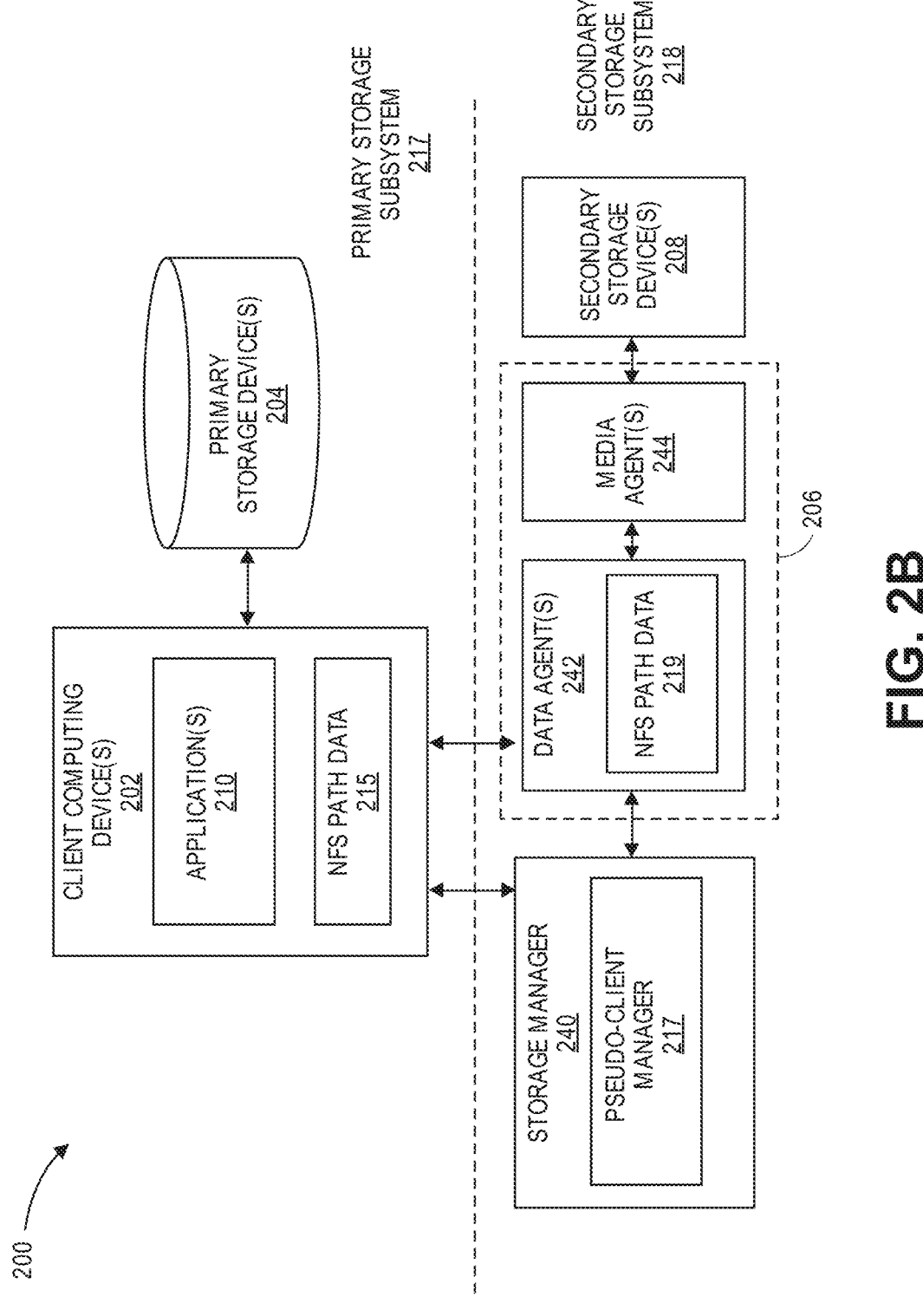
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
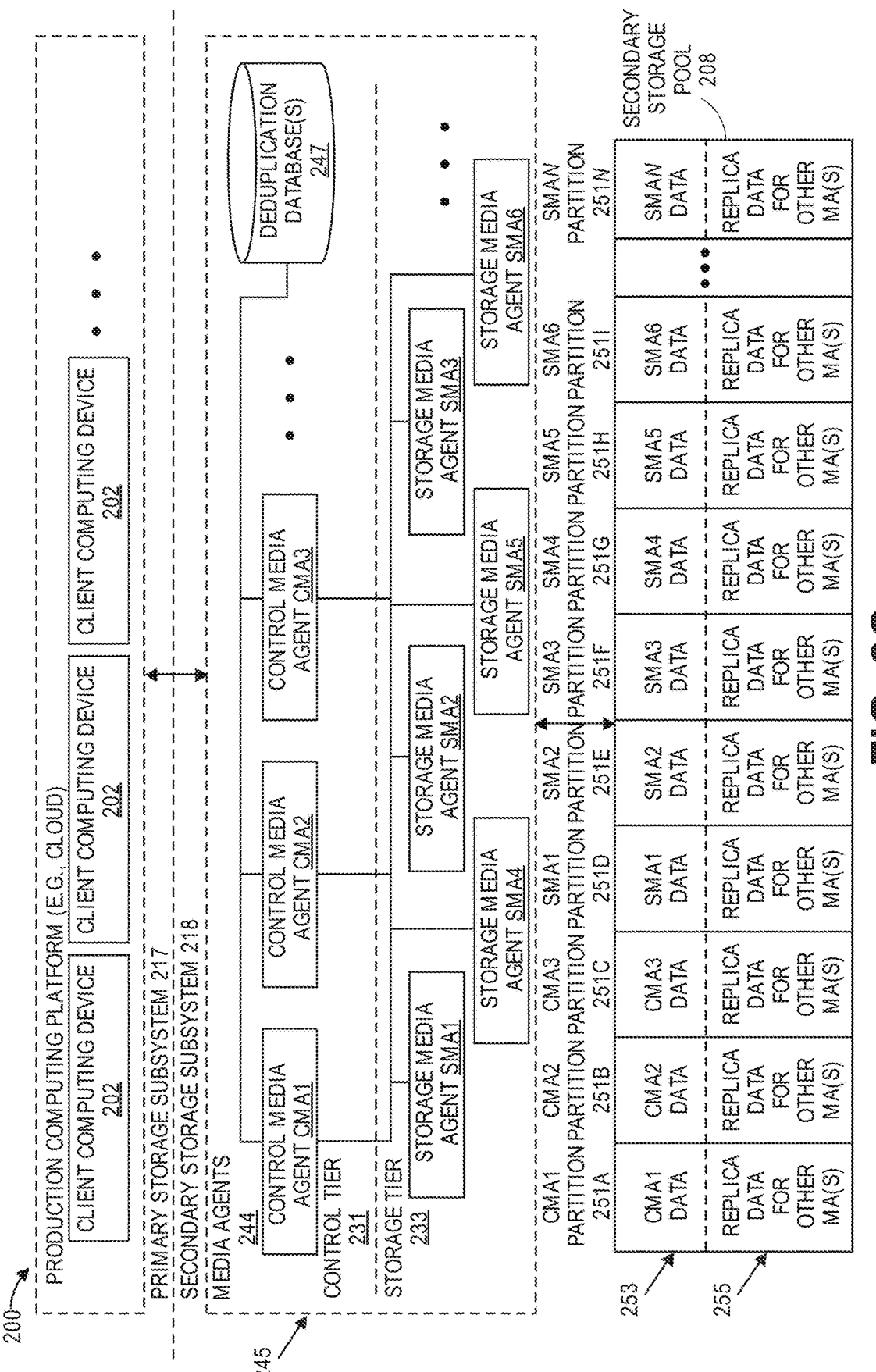
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Introduction to Ransomware

Ransomware has become one of the most widespread and damaging threats that Internet users face. It is a specific type of malware that enters a file system by exploiting vulnerabilities within the file system. Ransomware typically holds a user's data hostage by locking the desktop of the user or encrypting the user's files. For example, one type of ransomware may encrypt the user's files and leave a ransom note for the user, inviting the user to pay a sum of money (e.g., via anonymous payment mechanisms such as Bitcoin) in exchange for a decryption key that can be used to decrypt the user's files. Some examples of file-encrypting ransomware include Locky, CryptoWall, TorrentLocker, CTB-Locker, and TeslaCrypt, to name a few. Such ransomware may delete backup copies, snapshots, and/or shadow copies in order to prevent the user from recovering the encrypted files.

Further, other existing backup solutions may create a backup of the encrypted files without realizing that the file system has been attacked by ransomware. Such backup solutions may even prune prior versions of the backup that can potentially be used to recover the encrypted files. Without a safe backup copy that has not been infected by ransomware, recovering the encrypted files may be impossible without paying for the encryption key. Thus, an improved method for detecting ransomware and providing data protection is desired.

Automated Ransomware Detection

Ransomware typically involves an input/output (I/O) heavy process of encrypting data files and/or deleting or renaming the original files. Thus, ransomware attacks may be detected by analyzing the I/O activity in a given file system. For example, one type of file system operation that may be used to distinguish harmful ransomware from other harmless applications is file renaming. File renaming operations performed by ransomware (e.g., CryptoWall 4.0 or Locky) can be unusual. Most types of ransomware rename encrypted files with their own extensions (e.g., ".crypt", ".crypto", etc.). In some cases, the ransomware encrypts the entire file name instead of just changing the extension (e.g., the latest CryptoWall 4.0). These file renaming behaviors and other file system operations may make ransomware attacks stand out from file system operations performed by other safe applications running on the user's computer.

To keep track of which files in the file system are being created, modified, deleted, renamed, overwritten, etc., a software module running on a client machine may monitor the I/O activity in a file system. The monitored I/O activity may be analyzed to determine whether the I/O activity is normal or whether the I/O activity qualifies as an anomaly. If the I/O activity qualifies as an anomaly, the software module may preserve any backups created prior to the occurrence of the I/O activity and provide an alert to the user of the client machine that the client machine may be under a ransomware attack. An example system for automatically detecting such a ransomware attack is described below with reference to FIG. 3A.

Figure 3A:
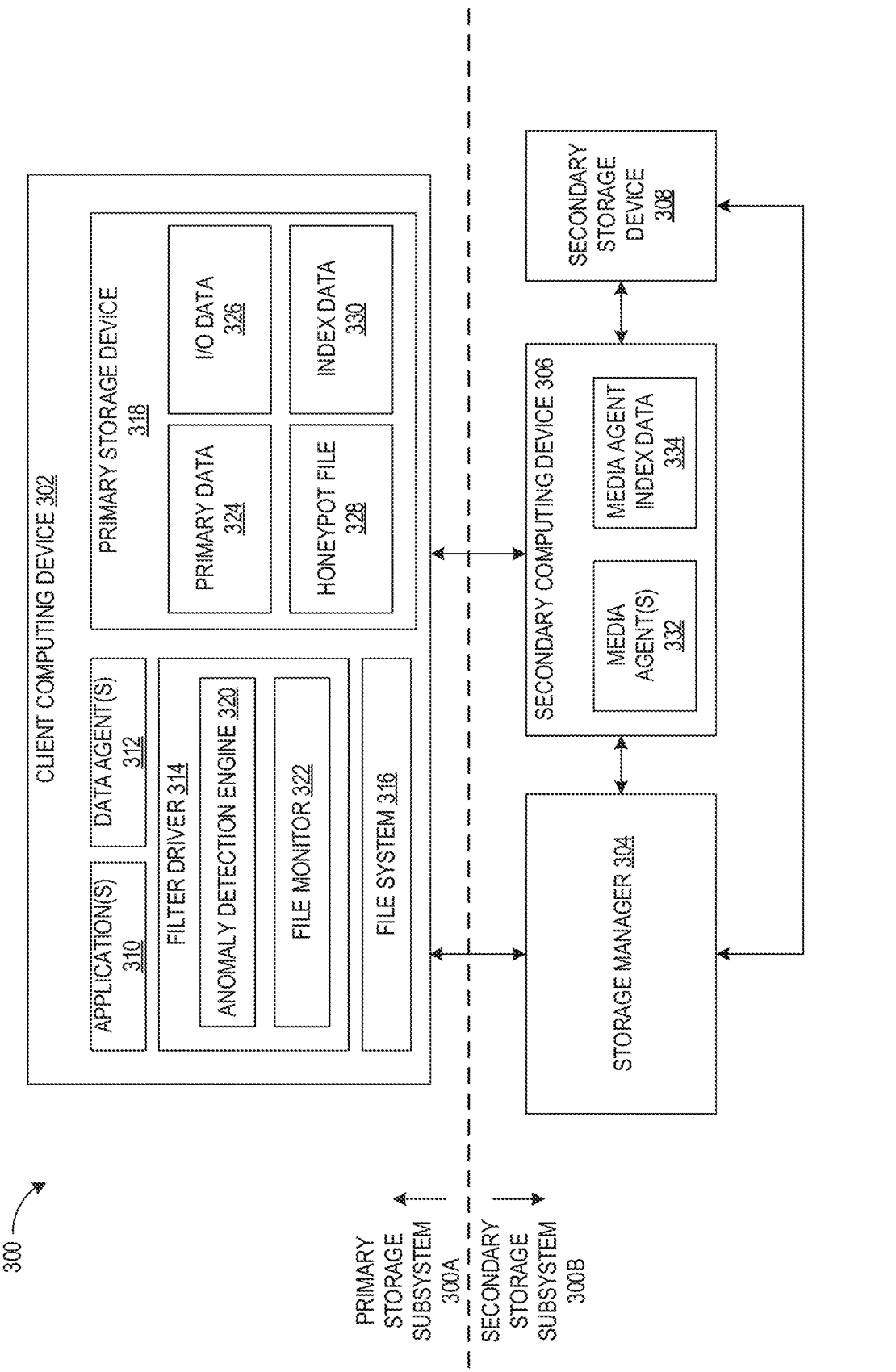
FIG. 3A is a block diagram illustrating some salient portions of a system 300 for automated ransomware detection, according to an illustrative embodiment of the present invention.

FIG. 3A is a block diagram illustrating an example system 300 configured to implement an automated ransomware detection process in accordance with one or more embodiments disclosed herein. As illustrated, the example 300 includes a client computing device 302, a storage manager 304, a secondary computing device 306, and a secondary storage device 308. The client computing device 302 may sometimes be referred to in some cases as a primary storage subsystem 300A, and some or all of the storage manager 304, the secondary computing device 306, and the secondary storage device 308 may sometimes be referred to as a secondary storage subsystem 300B. In some embodiments, the storage manager 304 may be part of the primary storage subsystem 300A instead of the secondary storage subsystem 300B, or may be part of neither the primary storage subsystem 300A nor the secondary storage subsystem 300B.

The client computing device 302 includes application(s) 310, data agent(s) 312, a filter driver 314, a file system 316, and a primary storage device 318. In some embodiments, the client computing device 302 may be a virtual machine running the application(s) 310. Although not illustrated in FIG. 3A, the client computing device 302 may further include one or more additional applications and/or data agents.

As previously described, for example with respect to FIG. 1C, the client computing device 302 may include one or more applications 310 and one or more data agents 312. At least some of the data agents 312 may correspond to one or more of the applications 310 and, as previously described, may facilitate data operations with respect to the corresponding application(s). Further, one or more of the data agents 312 may facilitate managing and/or interacting with the file system 316 of the client computing device 302. The file system 316 may include any type of file system that can be used by a client computing device 302. For example, the file system 316 may include a Microsoft Windows file system (e.g., FAT, NTFS, etc.), a Linux based file system, a Unix based file system, an Apple Macintosh file system (e.g., HFS Plus), and the like. In some instances, the client computing device 302 may include multiple file systems 316 of the same type or of a different type.

In addition to the previously described systems, the client computing device 302 may include a filter driver 314 that can interact with data (e.g., production data) associated with the applications 310. For instance, the filter driver 314 may comprise a file system filter driver, an operating system driver, a filtering program, a data trapping program, an application, a module of one or more of the applications 310, an application programming interface ("API"), or other like software module or process that, among other things, monitors and/or intercepts particular application requests targeted at a file system, another file system filter driver, a network attached storage ("NAS"), a storage area network ("SAN"), mass storage and/or other memory or raw data. In some embodiments, the filter driver 314 may reside in the I/O stack of an application 310 and may intercept, analyze, and/or copy certain data traveling to or from the application 310 from or to a file system.

In certain embodiments, the filter driver 314 may intercept data modification operations that include changes, updates, and/or new information (e.g., file creation, file deletion, file modification, file renaming, etc.) with respect to one or more of the application(s) 310. For example, the filter driver 314 may locate, monitor, and/or process one or more of the following with respect to a particular application 310, application type, or group of applications (e.g., some or all of the application(s) 310): file system operations (e.g., file creation, file deletion, file modification, file renaming), data management operations (e.g., data write operations, file attribute modifications), logs or journals (e.g., NTFS change journal), configuration files, file settings, control files, other files used by one or more of the application(s) 310, combinations of the same or the like. In certain embodiments, such data may also be gathered from files across multiple storage systems within the client computing device 302. Furthermore, the filter driver 314 may be configured to monitor changes to particular volumes, directories, and/or files within the file system 316.

The filter driver 314 may include a number of modules or subsystems that can facilitate performing various operations described herein with respect to the file system 316. For example, the filter driver 314 may include a number of modules or subsystems to facilitate automatic detection of ransomware and/or detection of other file system anomalies. In some embodiments, the filter driver 314 includes an anomaly detection engine 320 and a file monitor 322.

Using the file monitor 322, the filter driver 314 can monitor interactions with a file. This interaction can include accessing the file via the file system 316, one or more applications 310, one or more data agents 312, or through any other method of accessing or interacting with a file. In some cases, the file monitor 322 identifies when a file is modified and/or created. Monitoring the creation of a file can include identifying a "new" file operation, a "save as" operation, a "copy" operation, or any other operation that can result in a new file or a new copy of an existing file.

The anomaly detection engine 320 can determine, based on the interactions monitored by the file monitor 322, whether a file activity anomaly is detected. The operations of the anomaly detection engine 320 are described in greater detail below with reference to FIGS. 5-11. Otherwise, the components shown in FIG. 3A may be substantially similar to those described above with reference to FIGS. 1A-1G.

Figure 3B:
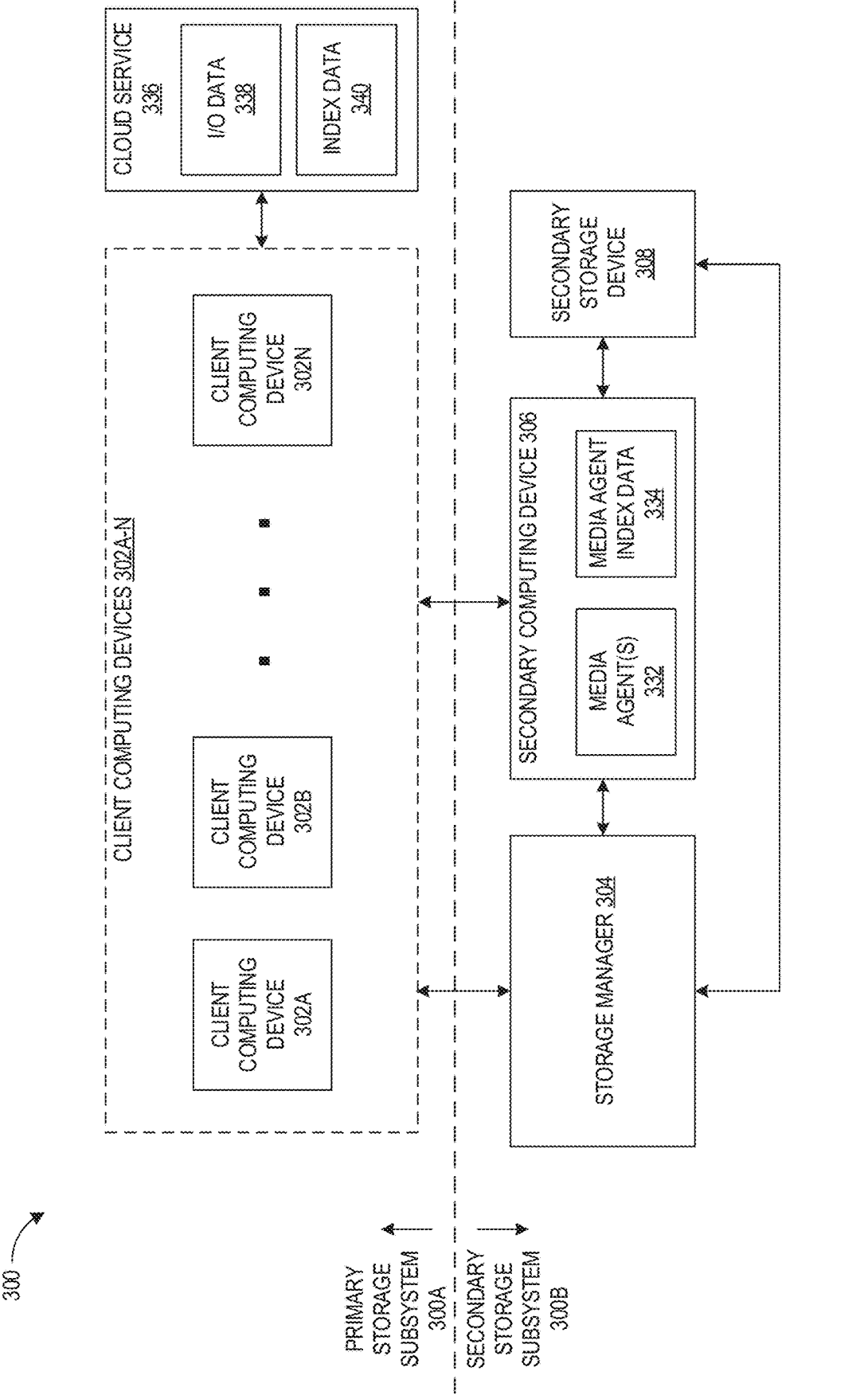
FIG. 3B is a block diagram illustrating some salient portions of a system 300 for automated ransomware detection, according to another illustrative embodiment of the present invention.

Another example of the system 300 is described below with reference to FIG. 3B. As shown in FIG. 3B, the system 300 may include a plurality of client computing devices 302. The client computing devices 302 may be similar to the client computing device 302 or any other client computing device described above. The plurality of client computing devices 302A-302N may each push the I/O data 338 collected on the respective client computing devices to a cloud service 336. The cloud service 336 may also store the index data 340 comprising information captured at the time of each backup associated with the respective client computing device 302.

The system 300 of FIG. 3B includes client computing devices 302A-N in communication with a cloud service 336 for storing I/O data 338 and index data 340 of the client computing devices 302A-N. For example, every time the I/O data 326 and the index data 330 are stored in the respective primary storage devices 318, the I/O data 326 and the index data 330 may also be transmitted to the cloud service 336 for storage. As another example, the I/O data 326 and the index data 330 stored in the respective primary storage devices 318 may be periodically pushed to the cloud service 336 for storage. The I/O data 338 and index data 340 of the client computing devices 302A-N may be accessed by individual client computing devices and utilized to detect file activity anomalies based on, for example, company-wide trends. For example, the anomaly detection engine 320 may determine that a given I/O activity is not an anomaly (or is an anomaly) in view of similar I/O activity (e.g., similar types of file system operations and/or over similar time periods) occurring on other client computing devices, even though without access to the I/O activity of other client computing devices, the anomaly detection engine 320 would have determined that the given I/O activity was an anomaly.

The anomaly detection engine 320 may determine that a given I/O activity is not an anomaly (e.g., even though the given I/O activity would qualify as an anomaly if considered by itself) based on a determination that (i) same or similar types of operations are performed on other client computing devices, (ii) same or similar number of operations are performed on other client computing devices, (iii) the number of operations performed on other client computing devices exceed their baseline numbers by the same or similar amount (e.g., absolute amount or percentage), or any combinations thereof.

Alternatively, the anomaly detection engine 320 may determine that a given I/O activity is an anomaly (e.g., even though the given I/O activity would not qualify as an anomaly if considered by itself) based on a determination that (i) same or similar types of operations are performed on other client computing devices, (ii) same or similar number of operations are performed on other client computing devices, (iii) the number of operations performed on other client computing devices exceed their baseline numbers by the same or similar amount (e.g., absolute amount or percentage), or any combinations thereof. Otherwise, the components shown in FIG. 3B may be substantially similar to those described above with reference to FIGS. 1A-1G and 3A.

Ransomware I/O Access Patterns

In some cases, different ransomware attacks may exhibit different I/O access patterns. One type of ransomware may attack a specific targeted file (.doc, .pdf, etc.) following a specific pattern. For example, the ransomware goes through the entire file system of a volume, finds the targeted files, and encrypts one of the targeted files. The ransomware may enumerate the existing directories and files and filter the files based on their extensions (e.g., by selecting only those files with specific extensions such as .doc, .pdf, .txt, .jpg, and etc., or those associated with specific applications, for encryption, and not selecting the other files in the system). The ransomware may then sequentially open and read the selected files, encrypting them one at a time. The ransomware may rewrite the selected files with high entropy buffers (e.g., encryption). For example, the filter driver 314 may determine the entropy difference in the data buffers before and after the write.

For example, the ransomware may read the first 1 MB of a file, encrypt the 1 MB of data, overwrite the original 1 MB of data with the encrypted data, and continue to encrypt the remaining portions of the file until the entire file is encrypted. Alternatively, the ransomware may create an encrypted version of the file in a temporary location and overwrite the file using the encrypted version (e.g., by moving the encrypted version to the original file location with a flag ReplaceIfExists having a true value). Then, the ransomware moves onto the remaining ones of the selected target files and encrypts them in the same manner. The ransomware may further rename the encrypted files (e.g., by changing the file name, the extension, or both).

Another type of ransomware may encrypt the data of an original file to a temporary file. After the ransomware finishes encrypting the original file, the ransomware may delete the original file and keep only the temporary file. In some cases, the ransomware may further rename the temporary file such that the temporary file has the file name of the original file.

Based on these I/O access patterns (e.g., high number of renames, renames to known ransomware extensions, high number of writes with high entropy value data buffers, high number of deletes, etc.), the anomaly detection engine 320 may determine that the client computing device 302 may be under attack and take appropriate remedial action, which is described in greater detail below.

Figure 4:
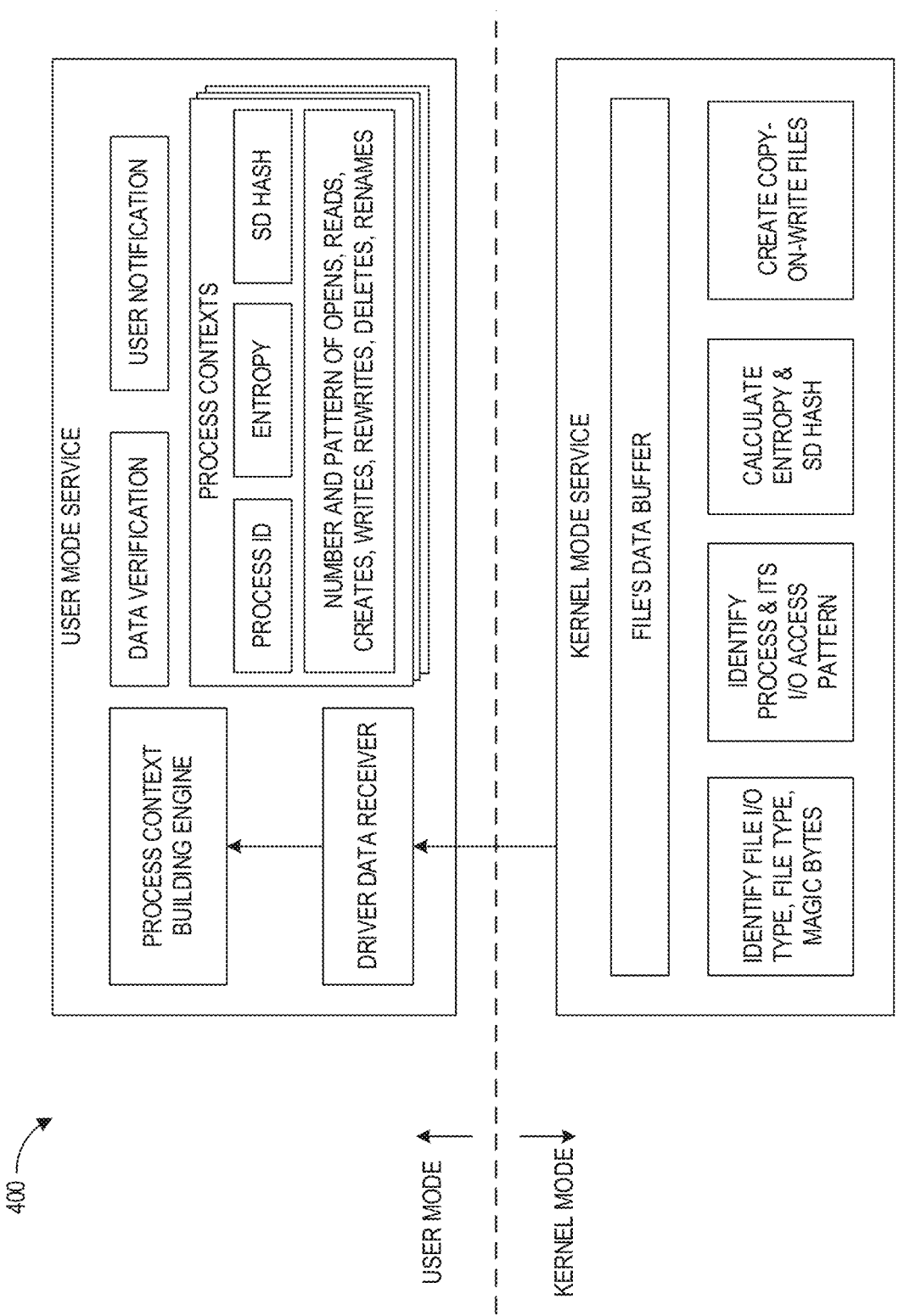
FIG. 4 is a block diagram illustrating some salient portions of a system 400 for automated ransomware detection, according to an illustrative embodiment of the present invention.

In some embodiments, as shown in FIG. 4, a kernel mode file system filter driver may intercept I/O requests of processes and send I/O information to the user mode service, which builds process contexts in order to isolate the malicious behaviour. Alternatively, in a directory change scan approach, a file system scan may be run periodically, and the process contexts may be built based on the information obtained by the file system scan. The I/O requests can be tracked by the file system filter driver, and encryption of the files in the file system can be predicted by calculating the entropy on data buffers.

Entropy is an indicator that provides information about the uncertainty of data. Some types of data, such as encrypted or compressed data, has a high entropy value. A ransomware attack may result in consistently high entropy output due to the data encryption performed by the ransomware. File types such as the binary, or pdf, or compressed files also have high entropy values, but additional methods such as mime type check, file header check, and sdhash can be utilized to reduce the number of false positives. Sdhash is a tool that allows two arbitrary blobs of data to be compared for similarity based on common strings of binary data. Sdhash is designed to provide quick results during triage and initial investigation phases. If a file modification is legitimate, the sdhash comparison of the files before and after is unlikely to indicate a significant change in the file content. Further, if a file modification is legitimate, the modified file should have a known Multipurpose Internet Mail Extensions (MIME) type (e.g., identifies a file on the Internet based on their nature and format). Further, if a file modification is legitimate, the modified file is likely to have a low entropy value. When a file is being encrypted, all three of these conditions may be false.

Real-Time Ransomware Detection

The most real-time approach would involve intercepting the I/O access of the processes running on the user's computer and identifying patterns that could be used to differentiate regular I/O access from ransomware I/O access. Such an approach can, for example, utilize a kernel mode file system filter driver (e.g., filter driver 314) installed on the user's computer to identify such patterns. An example method for detecting such a ransomware attack in real time is described below with reference to FIG. 5.

FIG. 5 is a flow diagram illustrative of one embodiment of a method 500 for intercepting I/O access requests of the processes running on the client computing device 302 and identifying a file activity anomaly in real time. The method 500 is described with respect to the system 300 of FIG. 3A. However, one or more of the steps of method 500 may be implemented by other information management systems, such as those described in greater detail above with reference to FIG. 1D. The method 500 can be implemented by any one of, or a combination of, a client computing device, a storage manager, a data agent, a media agent, and the like. Although the steps in the method 500 are described as being performed by the filter driver 314 of the system 300, the embodiments discussed herein are not limited as such, and one or more of the steps in the method 500 may be performed by other components of the system 300, either alone or in combination.

At block 502, the filter driver 314 monitors the I/O access of one or more processes running on the client computing device 302. For example, the filter driver 314 may intercept I/O requests to the file system 316 and keep track of what kind of and how many file system operations are being performed by which process. As discussed herein, the file system operations may include file creations, modifications, deletes, renames, writes, overwrites, to name a few.

At block 504, the filter driver 314 generates process contexts based on the I/O access. The process contexts may include a process ID corresponding to the given process, an entropy value indicative of the degree of uncertainty of the files, an sdhash value indicative of the degree of change (e.g., for writes and rewrites), the number of file opens, reads, creates, writes, rewrites, deletes, renames, etc., the pattern of such file opens, reads, creates, writes, rewrites, deletes, renames, etc., and/or the timestamps associated with such file opens, reads, creates, writes, rewrites, deletes, renames, etc.

At block 506, the filter driver 314 compares the process contexts to a threshold for detecting a file activity anomaly. The threshold may comprise a baseline number of file system operations for the specific client computing device 302 (e.g., average number of file opens, reads, creates, writes, rewrites, deletes, renames, etc. performed on the client computing device 302). For example, the threshold may be a multiple or fraction of the average number of file operations (e.g., 110%, 150%, 200%, etc.). In some embodiments, the process contexts may include a running count or variable that is continuously and/or periodically compared to the threshold. The running count may sometimes not include file system operations that are older than a specific time period (e.g., 5 seconds, 30 seconds, 1 minute, 5 minutes, etc.). For example, 100 renaming operations performed over 5 minutes may not trigger the anomaly detection, whereas 100 renaming operations performed over 5 seconds may trigger the anomaly detection.

One or more thresholds described herein may be machine- or user-specific such that the thresholds are based on the historical I/O activity for the specific user or for the specific client computing device 302 (e.g., 110% of the average number of file creations, deletions, etc. performed on behalf of the specific user or on the specific client computing device 302). For example, such thresholds may change over time as the I/O activity pattern changes for the specific user or for the specific client computing device 302. In some embodiments, one or more thresholds described herein may be machine-type-specific such that the thresholds are based on whether the machine is a dial-up machine, a developer machine, a sales machine, a desktop machine, a laptop machine, and/or which geographical area the machine is located. For example, the threshold number of file creations for a sales machine (or another machine type associated with a lower number of file operations) may be 50 for a period of 5 minutes, whereas the threshold number of file creations for a developer machine (or another machine type associated with a higher number of file operations) may be 500 for a period of 5 minutes.

At block 508, the filter driver 314 determines, based on the comparison, whether a file activity anomaly is detected. For example, upon determining that the number of renames is greater than the baseline number of renames associated with the client computing device 302 by 10%, the filter driver 314 may determine that the rename operations qualify as a file activity anomaly. As another example, upon determining that the difference the entropy value of the file buffer prior to a rewrite operation and the entropy value of the file buffer after the rewrite operation is greater than a threshold value, the filter driver 314 may determine that the rewrite operation qualifies as a file activity anomaly. As another example, upon determining that the sdhash value associated with a given file system operation is greater than a threshold value, the filter driver 314 may determine that the given file system operation qualifies as a file activity anomaly. In some cases, the threshold may be associated with a specific time window, where file system operations outside the specific time window are not considered in the determination of whether a file activity is detected. In such cases, 100 renaming operations performed over 5 minutes may not trigger the anomaly detection, whereas 100 renaming operations performed over 5 seconds may trigger the anomaly detection. Upon determining that one or more file system operations qualify as a file activity anomaly, the method 500 proceeds to block 510. Otherwise, the method 500 proceeds to block 502, where the filter driver 314 continues to monitor the I/O access pattern associated with the file system 316.

Figure 16:
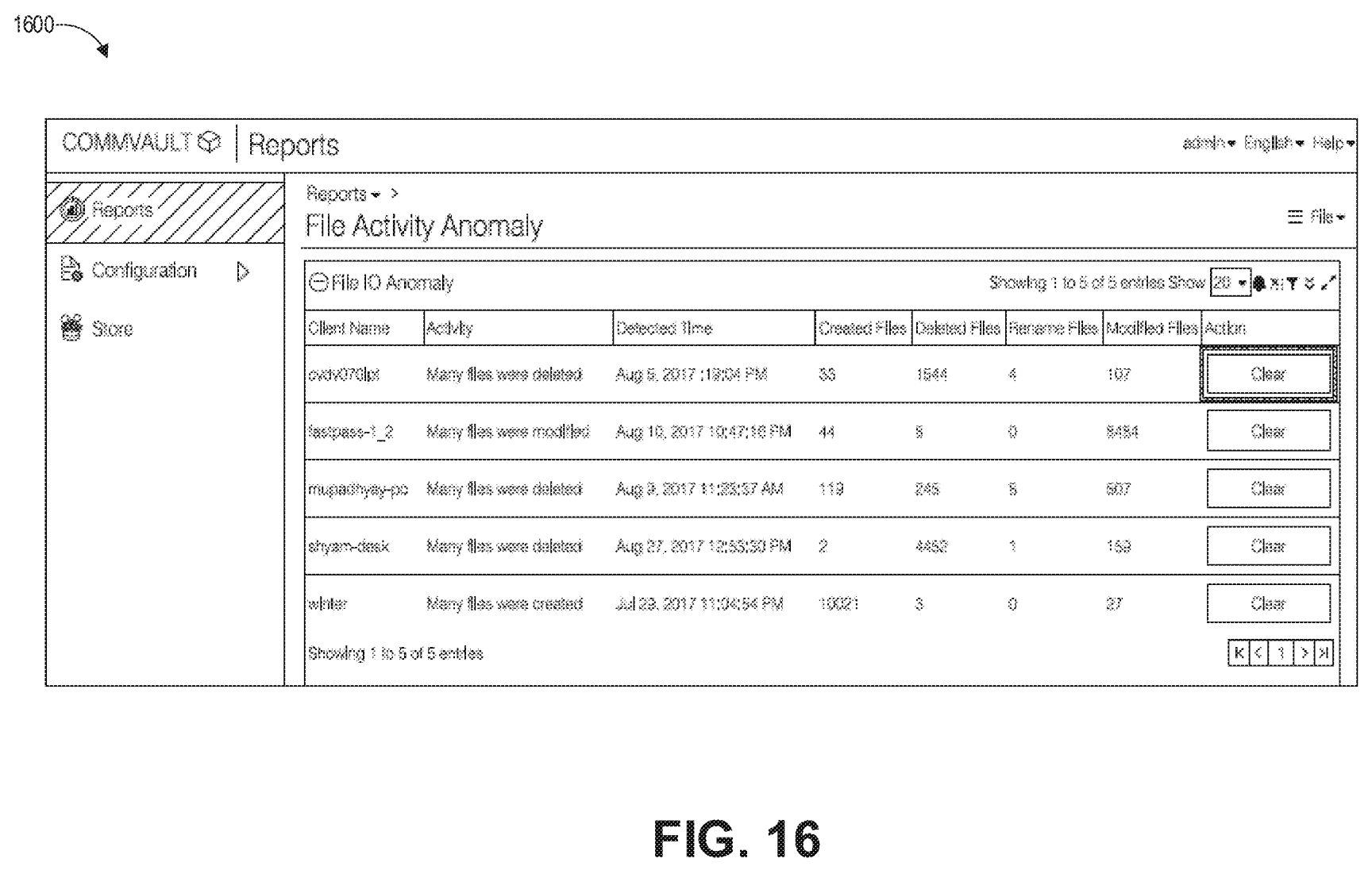

At block 510, the filter driver 314 causes a warning to be output (e.g., via a user interface, email, or another notification service). For example, the filter driver 314 may cause the client computing device 302 to display a file activity anomaly alert 1400 shown in FIG. 14. The filter driver 314 may further cause a report to be stored in a page accessible by the user (e.g., as illustrated by the user interface 1500 of FIG. 15). Further, as illustrated by the user interface 1600 of FIG. 16, the report may include user interface elements (e.g., the button labeled "Clear" in FIG. 16) for clearing or ignoring the detected file activity anomalies. As shown in FIG. 16, file activity anomalies detected in multiple client computing devices 302 may be presented via a single user interface and provide an indication of the file system operations that triggered the anomaly detection.

The method 500 can include fewer, more, or different blocks than those illustrated in FIG. 5 and/or one or more blocks illustrated in FIG. 5 may be modified, omitted, or switched without departing from the spirit and scope of the description. For example, the method 500 may include performing additional remedial actions such as disabling some or all of the operations (e.g., data backup, data pruning, data restores, data archiving, data migration, etc.) of the data agent 312. Further, one or more of the operations described as being performed by the filter driver 314 may be performed by the data agent 312 or another component of the client computing device 302 not illustrated in FIG. 3A. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Ransomware Detection Based on Directory Change Information

Another approach that may be used to detect ransomware attacks is to track the data transformation using a directory change callback. In such an approach, tracking of the individual processes (e.g., as described in connection with FIG. 5) may not be available. The operating system running on the client computing device 302 may provide a notification interface that can be utilized to determine directory change information (e.g., the I/O operations that have been performed on the file system 316). An example method for detecting such a ransomware attack based on such directory change information is described below with reference to FIG. 6.

FIG. 6 is a flow diagram illustrative of one embodiment of a method 600 for performing file activity anomaly detection based on a directory change callback. The method 600 is described with respect to the system 300 of FIG. 3A. However, one or more of the steps of method 600 may be implemented by other information management systems, such as those described in greater detail above with reference to FIG. 1D. The method 600 can be implemented by any one of, or a combination of, of a client computing device, a storage manager, a data agent, a media agent, and the like. Although the steps in the method 600 are described as being performed by the anomaly detection engine 320 of the system 300, the embodiments discussed herein are not limited as such, and one or more of the steps in the method 600 may be performed by other components of the system 300, either alone or in combination. Although the anomaly detection engine 320 is illustrated in FIG. 3A as being part of the filter driver 314, alternatively, the anomaly detection engine 320 may be separate from the filter driver 314 in one or more embodiments described in the present disclosure. In some cases, the anomaly detection engine 320 does not have access to the I/O requests from other processes running on the client computing device 302 to the file system 316.

At block 602, the anomaly detection engine 320 obtains directory change information from a notification interface (e.g., ReadDirectoryChangeW). The directory change information may include information relating to one or more file system operations associated with a given directory or directory-tree in the file system 316. For example, the directory change information may include file name changes, directory name changes, file attribute changes, file size changes, last write time changes, last access time changes, creation time changes, and/or any other changes in the directory or the files in the directory. In some cases, the directory change information is received in multiple iterations (e.g., for multiple directories, multiple instances of changes, and/or multiple time periods).

The directory change information received from the notification service may identify which files were modified at what time, but may not include information necessary to determine the entropy change or sdhash value. Thus, without using the entropy change or sdhash value, the anomaly detection engine 320 may utilize the MIME type information, file header information, and/or file entropy information associated with a given file to determine whether the file is encrypted. For example, every document begins with a magic number (e.g., MIME type) that uniquely identifies the file type, and if ransomware encrypts this portion of the file, a check for this magic number would reveal that the file has been encrypted by ransomware (e.g., if the magic number does not correspond to a known file type). For example, TorrentLocker encrypts the first few MBs of a file instead of the entire file, and whether a file is infected by Torrent-Locker can be determined by checking the MIME type of the file. Additionally or alternatively, the entropy value of the file may be utilized to determine whether the file is encrypted by ransomware.

At block 604, the anomaly detection engine 320 determines the number of file system operations performed for a given directory or volume (e.g., the number of file opens, reads, creates, writes, rewrites, deletes, renames, etc., the pattern of such file opens, reads, creates, writes, rewrites, deletes, renames, etc., and/or the timestamps associated with such file opens, reads, creates, writes, rewrites, deletes, renames, etc.). Additionally or alternatively, the anomaly detection engine 320 may, in order to improve or facilitate detection of a file activity anomaly, perform any of the following operations: (1) determine the number of file renames, (2) check for known file extensions, (3) detect unknown operating system scheduler jobs, (4) detect unknown programs in the start-up task list, (5) detect Volume Shadow Copy Service (VSS) shadow deletes, (6) detect a large number of new file extensions not previously seen in the file system 316, (7) detect disabling of operating system start-up repair, (8) detect disabling of system restore, (9) detect desktop image change, and/or (10) determine MIME type.

At block 606, the anomaly detection engine 320 stores the determined number of file system operations in a local database (e.g., a SQL database that is protected from ransomware attacks). For example, the anomaly detection engine 320 may store, among other things, information regarding file modifications, file creations (e.g., temporary files), file deletions (e.g., original files), and/or file renaming (e.g., deleting and/or renaming original files) associated with one or more directories in the file system 316. In some cases, such a local database is not accessible by any process or application running on the client computing device 302 other than that performing the file activity anomaly detection. For example, the local database is machine-specific and may be hidden from all processes other than that performing the file activity anomaly detection (e.g., filter driver 314 or anomaly detection engine 320). In other cases, processes or applications other than that performing the file activity anomaly detection may have read-only access to the local database. In some embodiments, the filter driver 314 blocks any I/O requests to the local database originating from an unknown process or application. In some cases, the database is not local and is remotely located from the client computing device 302.

At block 608, the anomaly detection engine 320 runs an anomaly detection algorithm. For example, such an algorithm may compare the data stored in the local database with one or more thresholds for triggering a file activity anomaly detection, as described in connection with block 506. The anomaly detection engine 320 may run the anomaly detection algorithm on the local database periodically (e.g., every 5 minutes, 30 minutes, 1 hour, 6 hours, 12 hours, 24 hours, 7 days, etc.). The anomaly detection algorithm may determine, based on the historical data stored in the local database, a baseline number of file system operations and detect any spikes in the number of file system operations based on the baseline number. For example, if 100 file deletes were performed during the past 10 days, and the anomaly detection engine 320 determines that 2000 file deletes occurred today, the anomaly detection engine 320 may flag the 2000 file deletes as a file activity anomaly and alert the user and/or take remedial action. In some embodiments, file system operations associated with temporary files are excluded from consideration by the anomaly detection engine 320 for file activity anomaly detection. Alternatively, in some other embodiments, file system operations associated with temporary files are not excluded from consideration by the anomaly detection engine 320 for file activity anomaly detection.

At block 610, the anomaly detection engine 320 determines whether a file activity anomaly is detected. For example, upon determining that the number of renames is greater than the baseline number of renames associated with the client computing device 302 by 10%, the anomaly detection engine 320 may determine that the rename operations qualify as a file activity anomaly. In some cases, the threshold may be associated with a specific time window, where file system operations outside the specific time window are not considered in the determination of whether a file activity is detected. In such cases, 100 renaming operations performed over 5 minutes may not trigger the anomaly detection, whereas 100 renaming operations performed over 5 seconds may trigger the anomaly detection. Although rename operation is used as an example, file deletions exceeding a threshold, file creations exceeding a threshold, file modifications exceeding a threshold, any combinations of file system operations exceeding one or more thresholds (e.g., file renames exceeding 100 and file creations exceeding 70 for a given cycle at which the anomaly detection is performed).

As another example, the anomaly detection engine 320 may detect a file activity anomaly based on any one or more of the following: (1) the number of file renames exceeding a threshold, (2) the file extension being one of known ransomware extensions, (3) file system operations initiated by an unknown operating system scheduler, (4) detect unknown programs in the start-up task list, (5) one or more VSS shadow deletes, (6) the number of new file extensions not previously seen in the file system 316 exceeding a threshold, (7) the operating system start-up repair being disabled, (8) the system restore being disabled, (9) change in the desktop image, and/or (10) the MIME type being unknown, the MIME type being one of specific MIME types, or not being one of specific MIME types.

In some embodiments, the anomaly detection engine 320 determines that files associated with certain file types or certain file extensions are not being accessed or modified while files associated with other file types or other file extensions are being accessed or modified (e.g., beyond a threshold level). If the file types/extensions not being accessed or modified are not associated with ransomware (e.g., not part of a list of common file types/extensions targeted by ransomware) and the file types/extensions being accessed or modified are associated with ransomware (e.g., part of a list of common file types/extensions targeted by ransomware), the anomaly detection engine 320 may determine that a file activity anomaly is detected. By analyzing which file types/extensions are being ignored by the process/application that is heavily accessing or modifying specific file types/extensions, the anomaly detection engine 320 may determine that a file activity anomaly is detected. Upon determining that one or more file system operations qualify as a file activity anomaly, the method 600 proceeds to block 612. Otherwise, the method 600 proceeds to block 602, where the anomaly detection engine 320 continues to obtain additional directory change information associated with one or more directories in the file system 316.

At block 612, the anomaly detection engine 320 causes a warning to be output (e.g., via a user interface, email, or another notification service). For example, the anomaly detection engine 320 may cause the client computing device 302 to display a file activity anomaly alert 1400 shown in FIG. 14. The anomaly detection engine 320 may further cause a report to be stored in a page accessible by the user (e.g., as illustrated by the user interface 1500 of FIG. 15). Further, as illustrated by the user interface 1600 of FIG. 16, the report may include user interface elements (e.g., the button labeled "Clear" in FIG. 16) for clearing or ignoring the detected file activity anomalies. As shown in FIG. 16, file activity anomalies detected in multiple client computing devices 302 may be presented via a single user interface and provide an indication of the file system operations that triggered the anomaly detection.

The method 600 can include fewer, more, or different blocks than those illustrated in FIG. 6 and/or one or more blocks illustrated in FIG. 6 may be modified, omitted, or switched without departing from the spirit and scope of the description. For example, the method 600 may include performing additional remedial actions such as disabling some or all of the operations (e.g., data backup, data pruning, data restores, data archiving, data migration, etc.) of the data agent 312. Further, one or more of the operations described as being performed by the anomaly detection engine 320 may be performed by the data agent 312 or another component of the client computing device 302 not illustrated in FIG. 3A. In some cases, anomaly detection based on directory change information may result in a reduced number of false positives since the amount of information available to the anomaly detection engine 320 may be greater (e.g., anomaly detection based on directory change information may be performed every 5 minutes based on the I/O activity information over those 5 minutes, whereas the real-time detection by the filter driver 314 may be continuously performed or performed at a shorter cycle, e.g., 5 seconds, 15 seconds, 30 seconds, 1 minute, etc.). Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Ransomware Detection Based on Honeypot Files

In some embodiments, the anomaly detection engine 320 may create honeypot files 328 (or canary files). For example, since the honeypot files 328 serve no purpose other than to bait ransomware, any access to the honeypot files 328 can automatically trigger ransomware or file activity anomaly detection. The honeypot files 328 may have specific file extensions known to be targeted by ransomware (e.g., .doc, .xls, pdf, etc.). The filter driver 314 and/or the anomaly detection engine 320 may monitor I/O access to the honeypot files 328, and any modification (e.g., writes or deletes) to the honeypot files 328 may automatically trigger ransomware or file activity anomaly detection.

Ransomware Protection Based on Copy-On-Write

Ransomware attacks usually run for a few minutes. Once the encryption phase of the ransomware attack is finished, the ransomware copies the ransom note to as many places as possible to let the user know about the attack. Thus, the user is likely to find out about any successful ransomware attacks within less than a day. In some embodiments, copy-on-write is utilized by the client computing device 302 to protect against possible ransomware attacks. In such embodiments, any modification of a file would trigger the file to be copied and stored in a separate location for the duration of a retention period. The filter driver 314 and/or the anomaly detection engine 320 may cause any modified files to be copied and stored in a safe location prior to the modification, and upon detecting a ransomware attack or after the ransomware has encrypted or locked certain files in the file system 316, the filter driver 314 and/or the anomaly detection engine 320 may restore the copies of the files from the safe location. For example, the safe location may be hidden from any processes or applications other than the filter driver 314 and/or the anomaly detection engine 320, or any I/O access to the safe location from processes or applications other than the filter driver 314 and/or the anomaly detection engine 320 may be blocked. The retention period may be set to 1 day (or longer) so that the copies remain in the safe location at least for a period longer than the time it takes the ransomware to encrypt the files and present the ransom note.

Ransomware Detection Based on Media Agent Index Data

As discussed above with reference to FIG. 1C, the mediate agent(s) 332 may store media agent index data 334 comprising information about backup operations or other secondary copy operations. The media agent index data 334 may include at least some of the information stored in the local database of the client computing device 302 at block 606 of FIG. 6. For example, the media agent index data 334 may indicate, for each backup job, how many files were created and how many files were deleted since the most recent backup job. In some cases, the media agent index data 334 is stored locally in the primary storage device 318 as the index data 330. In some embodiments, the media agent index data 334 includes index data corresponding to multiple client computing devices 302, whereas index data 330 includes index data corresponding to only the client computing device 302 on which the index data 330 is stored. In some cases, the media agent index data 334 and/or the index data 330 do not include data relating to file renames. The media agent(s) 332 may update the media agent index data 334 upon every backup operation or other data protection operation.

In some embodiments, the anomaly detection engine 320 detects a file activity anomaly based on both the I/O data 326 stored in the local database and the media agent index data 334 stored in association with the media agent(s) 332. Alternatively, the anomaly detection engine 320 may detect a file activity anomaly based on both the I/O data 326 and the index data 330 stored in the local database. In other embodiments, the anomaly detection engine 320 detects a file activity anomaly based on only one of the I/O data 326 or the index data 330 stored in the local database. In other embodiments, the anomaly detection engine 320 detects a file activity anomaly based on the I/O data 326 for a specific time period for which the I/O data 326 is available and the index data 330 for time periods other than the specific time period. For example, the index data 330 may include data corresponding to a longer time period (e.g., 1 year, 5 years, etc.) than the I/O data 326 (e.g., 5 minutes, 30 minutes, 24 hours, etc., and the anomaly detection engine 320 may utilize the I/O data 326, which may be more comprehensive, if the I/O data 326 is available, and for time periods for which the I/O data 326 is not available, the anomaly detection engine 320 may utilize the index data 330. In some cases, the anomaly detection engine 320 only utilizes the index data 330 and not the I/O data 326. Alternatively, the anomaly detection engine 320 may only utilize the I/O data 326 and not the index data 330.

In some embodiments, the anomaly detection engine 320 preliminarily determines that an I/O activity pattern qualifies as a file activity anomaly based on the I/O data 326 associated with the file system 316 (or the client computing device 302) and subsequently determines that, in view of the index data 330 associated with the file system 316 (or the client computing device 302), the I/O activity pattern does not qualify as a file activity anomaly. For example, the anomaly detection engine 320 may determine that the 1000 file creations that occurred in the last 5 minutes exceed a threshold number for triggering detection of a file activity anomaly. However, the anomaly detection engine 320 may further determine, based on the index data 330, that the 1000 file creations coincide with the file creations that occur around or at the same time every year for the past 10 years. Based on this determination, the anomaly detection engine 320 may refrain from triggering detection of a file activity anomaly or flagging the I/O activity pattern to the user.

In some embodiments, the anomaly detection engine 320 preliminarily determines that an I/O activity pattern qualifies as a file activity anomaly based on the I/O data 326 associated with the client computing device 302 (or the file system 316) and subsequently determines that, in view of the I/O data 338 associated with multiple client computing devices 302 (or the file systems thereof), the I/O activity pattern does not qualify as a file activity anomaly. For example, the anomaly detection engine 320 may determine that the 1000 file creations that occurred in the last 5 minutes exceed a threshold number for triggering detection of a file activity anomaly. However, the anomaly detection engine 320 may further determine, based on the I/O data 338, that the 1000 file creations coincide with the file creations that are occurring on multiple client computing devices (e.g., company-wide addition of new files). Based on this determination, the anomaly detection engine 320 may refrain from triggering detection of a file activity anomaly or flagging the I/O activity pattern to the user.

Improving Anomaly Detection Engine Based on User Feedback

As discussed above with reference to FIGS. 5 and 6, potential ransomware attacks may be detected based on the number of file system operations performed exceeding a given threshold. However, there are tasks that are not related to ransomware and still result in a high number of file system operations such as transferring a large number of photos from his or her smartphone, or syncing cloud data created/modified after a long business trip. These tasks can falsely trigger the remedial measures associated with ransomware (e.g., alert to the user, disabling of data aging, automatic restore of backup data, etc.). To reduce such false positives, user feedback can be utilized. An example method for improving the anomaly detection engine 320 based on user feedback is described below with reference to FIG. 7.

FIG. 7 is a flow diagram illustrative of one embodiment of a method 700 for improving the anomaly detection engine 320 based on user feedback. The method 700 is described with respect to the system 300 of FIG. 3A. However, one or more of the steps of method 700 may be implemented by other information management systems, such as those described in greater detail above with reference to FIG. 1D. The method 700 can be implemented by any one of, or a combination of, of a client computing device, a storage manager, a data agent, a media agent, and the like. Although the steps in the method 700 are described as being performed by the anomaly detection engine 320 of the system 300, the embodiments discussed herein are not limited as such, and one or more of the steps in the method 700 may be performed by other components of the system 300, either alone or in combination.

At block 702, the anomaly detection engine 320 detects a file activity anomaly. For example, the anomaly detection engine 320 may detect the file activity anomaly using any one of the file activity anomaly detection techniques described herein.

At block 704, the anomaly detection engine 320 alerts the user that a ransomware attack has been detected. For example, the anomaly detection engine 320 may cause a warning to be output (e.g., via a user interface, email, or another notification service). For example, the client computing device 302 may display a file activity anomaly alert 1400 shown in FIG. 14.

At block 706, the anomaly detection engine 320 determines, based on user feedback (or the lack thereof), whether the detection of the file activity anomaly was appropriate. For example, the user, upon receiving the alert, may provide an indication that the detected file activity anomaly was not appropriate. As shown in FIG. 16, the user interface 1600 may provide a list of file activity anomalies and corresponding user interface elements for clearing the respective file activity anomalies (e.g., to indicate that the respective file activity anomalies were not appropriate). In some embodiments, the alert provided to the user at block 704 is an email, a text message, or another form of notification that includes a link for clearing the detected file activity anomaly. When the user activates the link, the anomaly detection engine 320 may receive an indication that the detected file activity anomaly corresponding to the activated link was not appropriate. In some embodiments, the user interface element or link for clearing the detected file activity anomaly remains available indefinitely. In other embodiments, if the user interface element or link is not activated within a specific time period, the anomaly detection engine 320 automatically determines that the detection of the corresponding file activity anomaly was appropriate without further user input or feedback. Alternatively, in some other embodiments, if the user interface element or link is not activated within a specific time period, the anomaly detection engine 320 automatically determines that the detection of the corresponding file activity anomaly was not appropriate without further user input or feedback.

Upon determining that the detection of the file activity anomaly was appropriate, the method 700 proceeds to block 708, where the anomaly detection engine 320 takes further remedial action (e.g., disable data aging, perform an automatic restore, etc.). Otherwise, the method 700 proceeds to block 710, where the anomaly detection engine 320 updates the anomaly detection threshold based on the feedback. For example, as discussed above, the feedback may comprise, for example, (i) user activation of the user interface element or link for clearing the detected file activity anomaly, or (ii) the absence of such user activation for a specific time period (e.g., a predetermined time period such as 1 hour, 12 hours, 24 hours, 7 days, etc.). In some embodiments, the feedback may also include user activation of a user interface element or link for confirming that the detected file activity anomaly was appropriate.

At block 710, the anomaly detection engine 320 may update the anomaly detection threshold such that the same or similar conditions that triggered the detection of the cleared file activity anomaly at block 702 would not result in the file activity anomaly detection in another instance in the future. For example, if the anomaly detection engine 320 detected, at block 702, a file activity anomaly based on 1000 file creations performed on December 31st and the detected fil activity anomaly was subsequently cleared by the user, the anomaly detection engine 320 may create a rule that prevents the anomaly detection engine 320 from (i) detecting a file activity anomaly based on 1000 file creations performed on December 31st, (ii) detecting a file activity anomaly based on 1000 file creations, (iii) detecting a file activity anomaly based on file creations performed on December 31st, or (iv) any combinations thereof. As another example, the anomaly detection engine 320 may ignore, in its future file activity anomaly detection, file system operations originating from the process or application associated with the cleared file activity anomaly.

In some embodiments, the anomaly detection engine 320 identifies two or more instances of clearing file activity anomalies triggered based on the same or similar conditions. Based on such identification, the anomaly detection engine 320 may create a rule that file system operations having the same or similar conditions as the cleared file activity anomalies are not to result in a file activity anomaly. For example, if the anomaly detection engine 320 determines three consecutive instances of the user clearing file activity anomalies detected based on the number of file creations performed in a 5-minute window exceeding 500, the anomaly detection engine 320 may create a rule that the number of file creations exceeding 500 cannot serve as a basis for detecting a file activity anomaly.

In some embodiments, the anomaly detection engine 320 determines that a threshold percentage of file activity anomalies detected based on the same or similar conditions have been cleared by the user. Based on such determination, the anomaly detection engine 320 may create a rule that file system operations having the same or similar conditions as the cleared file activity anomalies are not to result in a file activity anomaly. For example, if the anomaly detection engine 320 determines that 90% of the file activity anomalies detected based on the number of file renames performed in a 5-minute window exceeding 500, the anomaly detection engine 320 may create a rule that the number of file renames exceeding 500 cannot serve as a basis for detecting a file activity anomaly.

The method 700 can include fewer, more, or different blocks than those illustrated in FIG. 7 and/or one or more blocks illustrated in FIG. 7 may be modified, omitted, or switched without departing from the spirit and scope of the description. For example, block 708 may be performed prior to block 706, and upon a positive determination (e.g., YES) at block 706, the method 700 may proceed to the end block. Further, one or more of the operations described as being performed by the anomaly detection engine 320 may be performed by the data agent 312 or another component of the client computing device 302 not illustrated in FIG. 3A. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Disabling Data Agent Upon File Activity Anomaly Detection

As described above (e.g., with reference to FIG. 1C), a data agent (e.g., a software program executing on the client machine) is responsible for managing, initiating, or otherwise assisting in the performance of copying, archiving, migrating, and/or replicating of primary data and restoring and/or pruning secondary data (e.g., backup copies of the primary data). When a potential ransomware attack is detected, the data agent running on the client computing device 302 may need to be disabled in order to prevent the data agent from backing up infected data and/or removing backup copies according to the retention policy. An example method for disabling the data agent upon detection of a potential ransomware attack is described below with reference to FIG. 8.

FIG. 8 is a flow diagram illustrative of one embodiment of a method 800 for disabling a data agent upon detecting a file activity anomaly. The method 800 is described with respect to the system 300 of FIG. 3A. However, one or more of the steps of method 800 may be implemented by other information management systems, such as those described in greater detail above with reference to FIG. 1D. The method 800 can be implemented by any one of, or a combination of, of a client computing device, a storage manager, a data agent, a media agent, and the like. Although the steps in the method 800 are described as being performed by the anomaly detection engine 320 of the system 300, the embodiments discussed herein are not limited as such, and one or more of the steps in the method 800 may be performed by other components of the system 300, either alone or in combination.

At block 802, the anomaly detection engine 320 detects a file activity anomaly. For example, the anomaly detection engine 320 may detect the file activity anomaly using any one of the file activity anomaly detection techniques described herein.

At block 804, the anomaly detection engine 320 disables a data agent running on the client computing device 302. For example, the anomaly detection engine 320 may disable all data protection operations performed (or scheduled or configured to be performed) by the data agent. In some embodiments, the anomaly detection engine 320 disables only one or a subset of the data protection operations performed (or scheduled or configured to be performed) by the data agent.

At block 806, the anomaly detection engine 320 determines, based on user feedback (or the lack thereof), whether the detection of the file activity anomaly was appropriate. For example, the user, upon receiving the alert associated with the detected file activity anomaly, may provide an indication that the detected file activity anomaly was not appropriate (e.g., by activating the user interface element "Clear" shown in FIG. 16). Upon determining (e.g., based on user feedback or the lack thereof) that the detection of the file activity anomaly was appropriate, the method 800 ends. Otherwise, the method 800 proceeds to block 808, where the anomaly detection engine 320 updates the anomaly detection threshold based on the feedback and enables (or re-enables) the data agent. For example, the anomaly detection engine 320 may update the anomaly detection threshold or other rules for detecting a file activity anomaly using any of the techniques described herein (e.g., with reference to FIG. 7). Further, the anomaly detection engine 320 may enable (or re-enable) all data protection operations disabled at block 804.

The method 800 can include fewer, more, or different blocks than those illustrated in FIG. 8 and/or one or more blocks illustrated in FIG. 8 may be modified, omitted, or switched without departing from the spirit and scope of the description. Further, one or more of the operations described as being performed by the anomaly detection engine 320 may be performed by the data agent 312 or another component of the client computing device 302 not illustrated in FIG. 3A. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Disabling Data Pruning Upon File Activity Anomaly Detection

Upon detecting a potential ransomware attack, it may be beneficial to disable certain data protection operations such as data aging or pruning (e.g., deletion of old backup data from secondary storage) since such backup data may be needed for recover the data encrypted by ransomware. An example method for disabling the data agent upon detection of a potential ransomware attack is described below with reference to FIG. 9.

Figure 9:
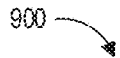
FIG. 9 depicts some salient operations of a method 900 according to an illustrative embodiment of the present invention.

FIG. 9 is a flow diagram illustrative of one embodiment of a method 900 for disabling data pruning upon detecting a file activity anomaly. The method 900 is described with respect to the system 300 of FIG. 3A. However, one or more of the steps of method 900 may be implemented by other information management systems, such as those described in greater detail above with reference to FIG. 1D. The method 900 can be implemented by any one of, or a combination of, of a client computing device, a storage manager, a data agent, a media agent, and the like. Although the steps in the method 900 are described as being performed by the client computing device 302 of the system 300, the embodiments discussed herein are not limited as such, and one or more of the steps in the method 900 may be performed by other components of the system 300, either alone or in combination.

At block 902, the client computing device 302 creates a backup of the primary data associated with the client computing device 302 (e.g., primary data 324). For example, the client computing device 302 may perform the backup according to any of the techniques described herein (e.g., with reference to FIG. 1C).

At block 904, the client computing device 302 prunes one or more backup copies of the primary data associated with the client computing device 302 that were previously created and stored in secondary storage (e.g., secondary storage device 308). For example, a data pruning policy associated with the client computing device 302 may specify that backup copies older than a threshold time period should be deleted in order to free up space in the secondary storage device 308. For example, the backup copies may be kept for only 1 year, after a year has elapsed since the creation of a given backup copy, the given backup copy may be deleted.

At block 906, the client computing device 302 determines whether a given file I/O activity qualifies as a file activity anomaly. For example, the client computing device 302 may detect the file activity anomaly using any one of the file activity anomaly detection techniques described herein. Upon detecting a file activity anomaly, the method 900 proceeds to block 908. Otherwise, the method 900 proceeds to block 902 to continue to create additional backup copies (e.g., according to a backup policy or schedule associated with the client computing device 302).

At block 908, the client computing device 302 disables data pruning in response to detecting a file activity anomaly. For example, disabling data pruning may prevent any additional backup copies associated with the client computing device 302 from being deleted from the secondary storage device 308.

At block 910, the client computing device 302 determines, based on user feedback (or the lack thereof), whether the detection of the file activity anomaly was appropriate. For example, the user, upon receiving the alert associated with the detected file activity anomaly, may provide an indication that the detected file activity anomaly was not appropriate (e.g., by activating the user interface element "Clear" shown in FIG. 16). Upon determining (e.g., based on user feedback or the lack thereof) that the detection of the file activity anomaly was appropriate, the method 900 proceeds to block 914, where client computing device 302 may perform additional remedial actions. Otherwise, the method 900 proceeds to block 912, where the client computing device 302 updates the anomaly detection threshold based on the feedback and enables (or re-enables) data pruning. For example, the client computing device 302 may update the anomaly detection threshold or other rules for detecting a file activity anomaly using any of the techniques described herein (e.g., with reference to FIG. 7). Further, the client computing device 302 may enable (or re-enable) data pruning such that backup copies associated with the client computing device 302 can be deleted from the secondary storage device 308 according to a data retention policy associated with the client computing device 302.

The method 900 can include fewer, more, or different blocks than those illustrated in FIG. 9 and/or one or more blocks illustrated in FIG. 9 may be modified, omitted, or switched without departing from the spirit and scope of the description. Further, one or more of the operations described as being performed by the client computing device 302 may be performed by the anomaly detection engine 320, the data agent 312, or another component of the client computing device 302 not illustrated in FIG. 3A. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Automated Point-In-Time Restore Upon File Activity Anomaly Detection

Once the files in a file system have been encrypted by ransomware, the user can no longer access the content of the files without the encryption key used by the ransomware. In such a case, if a backup copy of the files are available in secondary storage, restoring the backup copy may allow the user to regain access to the files. An example method for performing an automated point-in-time restore upon detection of a potential ransomware attack is described below with reference to FIG. 10.

FIG. 10 is a flow diagram illustrative of one embodiment of a method 1000 for performing an automated point-in-time restore upon detecting a file activity anomaly. The method 1000 is described with respect to the system 300 of FIG. 3A. However, one or more of the steps of method 1000 may be implemented by other information management systems, such as those described in greater detail above with reference to FIG. 1D. The method 1000 can be implemented by any one of, or a combination of, of a client computing device, a storage manager, a data agent, a media agent, and the like. Although the steps in the method 1000 are described as being performed by the client computing device 302 of the system 300, the embodiments discussed herein are not limited as such, and one or more of the steps in the method 1000 may be performed by other components of the system 300, either alone or in combination.

At block 1002, the client computing device 302 detects a file activity anomaly. For example, the client computing device 302 may detect the file activity anomaly using any one of the file activity anomaly detection techniques described herein.

At block 1004, the client computing device 302 records a timestamp associated with the detected file activity anomaly. For example, the timestamp may specify the time at which the file activity anomaly was detected. Alternatively, the timestamp may be a time prior to the time at which the file activity anomaly was detected. In some embodiments, the timestamp may specify the time at which the initial (e.g., first in time) file system operation that was used for detecting the file activity anomaly was performed. For example, if the file activity anomaly was detected based on 1,109 file creations performed on the client computing device 302, the timestamp may specify the time at which the very first one of the 1,109 files was created in the file system 316. Alternatively, in such an example, the timestamp may specify the time at which the very last one of the 1,109 files was created in the file system 316.

At block 1006, the client computing device 302 causes a warning to be output (e.g., via a user interface, email, or another notification service). For example, the client computing device 302 may display a file activity anomaly alert 1400 shown in FIG. 14.

At block 1008, the client computing device 302 determines whether the detected file activity anomaly is proper based on user feedback. For example, the client computing device 302 may determine that the detected file activity anomaly is proper based on a user input indicating that the detected file activity anomaly is proper. Alternatively, the client computing device 302 may determine that the detected file activity anomaly is not proper based on a user input indicating that the detected file activity anomaly is not proper. Based on a determination that the detected file activity anomaly is not proper, the method 1000 proceeds to block 1010. Otherwise, the method 1000 proceeds to block 1012.

At block 1010, the client computing device 302 determines, based on user feedback (or the lack thereof), whether the detection of the file activity anomaly was appropriate. For example, the user, upon receiving the alert associated with the detected file activity anomaly, may provide an indication that the detected file activity anomaly was not appropriate (e.g., by activating the user interface element "Clear" shown in FIG. 16). Upon determining (e.g., based on user feedback or the lack thereof) that the detection of the file activity anomaly was appropriate, the method 1000 proceeds to block 1012. Otherwise, the method 1000 proceeds to block 1010, where the client computing device 302 updates the anomaly detection threshold based on the feedback. For example, the client computing device 302 may update the anomaly detection threshold or other rules for detecting a file activity anomaly using any of the techniques described herein (e.g., with reference to FIG. 7).

At block 1012, the client computing device 302 performs a point-in-time restore to cause at least a portion of the file system 316 to be in a state prior to the time specified by the recorded timestamp. For example, the client computing device 302 may cause a backup copy associated with the client computing device 302 that is most recently stored in the secondary storage device 308 prior to the time specified by the recorded timestamp. In some embodiments, the client computing device 302 identifies a portion of the file system 316 (or a portion of the primary data 324) affected by the potential ransomware attack, and restores only a portion of the backup copy that corresponds to the affected portion of the file system 316 (or the primary data 324).

The method 1000 can include fewer, more, or different blocks than those illustrated in FIG. 10 and/or one or more blocks illustrated in FIG. 10 may be modified, omitted, or switched without departing from the spirit and scope of the description. Further, one or more of the operations described as being performed by the client computing device 302 may be performed by the anomaly detection engine 320, the data agent 312, or another component of the client computing device 302 not illustrated in FIG. 3A. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Ransomware Detection on a Central Server

In some cases, the file activity anomaly detection described herein may utilize I/O activity on other client machines in order to better determine whether certain file system operations qualify as an anomaly. An example method for performing file activity anomaly detection based on data from multiple client machines is described below with reference to FIG. 11.

FIG. 11 is a flow diagram illustrative of one embodiment of a method 1100 for performing file activity anomaly detection based on data from multiple client machines. The method 1100 is described with respect to the system 300 of FIG. 3B. However, one or more of the steps of method 1100 may be implemented by other information management systems, such as those described in greater detail above with reference to FIG. 1D. The method 1100 can be implemented by any one of, or a combination of, of a client computing device, a storage manager, a data agent, a media agent, and the like. Although the steps in the method 1100 are described as being performed by the client computing device 302 of the system 300, the embodiments discussed herein are not limited as such, and one or more of the steps in the method 1100 may be performed by other components of the system 300 (e.g., the cloud service 336), either alone or in combination.

At block 1102, the client computing device 302 obtains I/O data associated with multiple client computing devices. For example, the client computing device 302 may access the I/O data 338 stored by the cloud service 336. Alternatively, the client computing device 302 may receive the I/O data from the other client computing devices or from another device storing the I/O data associated with the multiple client computing devices. As described herein, the I/O data may include information indicative of the file opens, reads, creates, writes, rewrites, deletes, renames, etc. performed on the respective client computing devices.

At block 1104, the client computing device 302 identifies one or more group trends based on the I/O data. For example, the client computing device 302 may determine that two or more client computing devices are experiencing the same or similar kinds of file operations (e.g., the same or similar number of file opens, reads, creates, writes, rewrites, deletes, and/or renames).

At block 1106, the client computing device 302 updates the anomaly detection threshold based on the identified group trends. For example, the client computing device 302 may create a rule that causes the client computing device 302 to ignore a specific type of file system operations for file activity anomaly detection. For example, if the client computing device 302 determines that a set of file system operations, while sufficient to trigger an anomaly detection by itself, constitutes harmless operations performed also on one or more other client computing devices within the network, the client computing device 302 may create a rule that causes the client computing device 302 to ignore such operations when performing a file activity anomaly detection. Additionally or alternatively, the client computing device 302 may create a rule that causes the client computing device 302 to identify a specific type of file system operations as a file activity anomaly. For example, if the client computing device 302 determines that a set of file system operations, while insufficient to trigger an anomaly detection by itself, constitutes harmful operations performed also on one or more other client computing devices within the network, the client computing device 302 may create a rule that causes the client computing device 302 to identify such operations as a file activity anomaly.

At block 1108, the client computing device 302 determines whether a given file I/O activity qualifies as a file activity anomaly. For example, the client computing device 302 may detect the file activity anomaly using any one of the file activity anomaly detection techniques described herein. Upon detecting a file activity anomaly, the method 900 proceeds to block 1110. Otherwise, the method 900 proceeds to block 1102 to continue to obtain or monitor the I/O data associated with multiple client computing devices.

At block 1110, the client computing device 302 takes further remedial action (e.g., disable data aging, perform an automatic restore, etc.). In some embodiments, the client computing device 302 causes the same or similar remedial actions to be taken on other client computing device experiencing I/O activity that is the same or similar to the given file I/O activity determined to qualify as a file activity anomaly.

The method 1100 can include fewer, more, or different blocks than those illustrated in FIG. 11 and/or one or more blocks illustrated in FIG. 11 may be modified, omitted, or switched without departing from the spirit and scope of the description. Further, one or more of the operations described as being performed by the client computing device 302 may be performed by the anomaly detection engine 320, the data agent 312, or another component not illustrated in FIG. 3B. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Examples of Graphical User Interface

Figure 13:
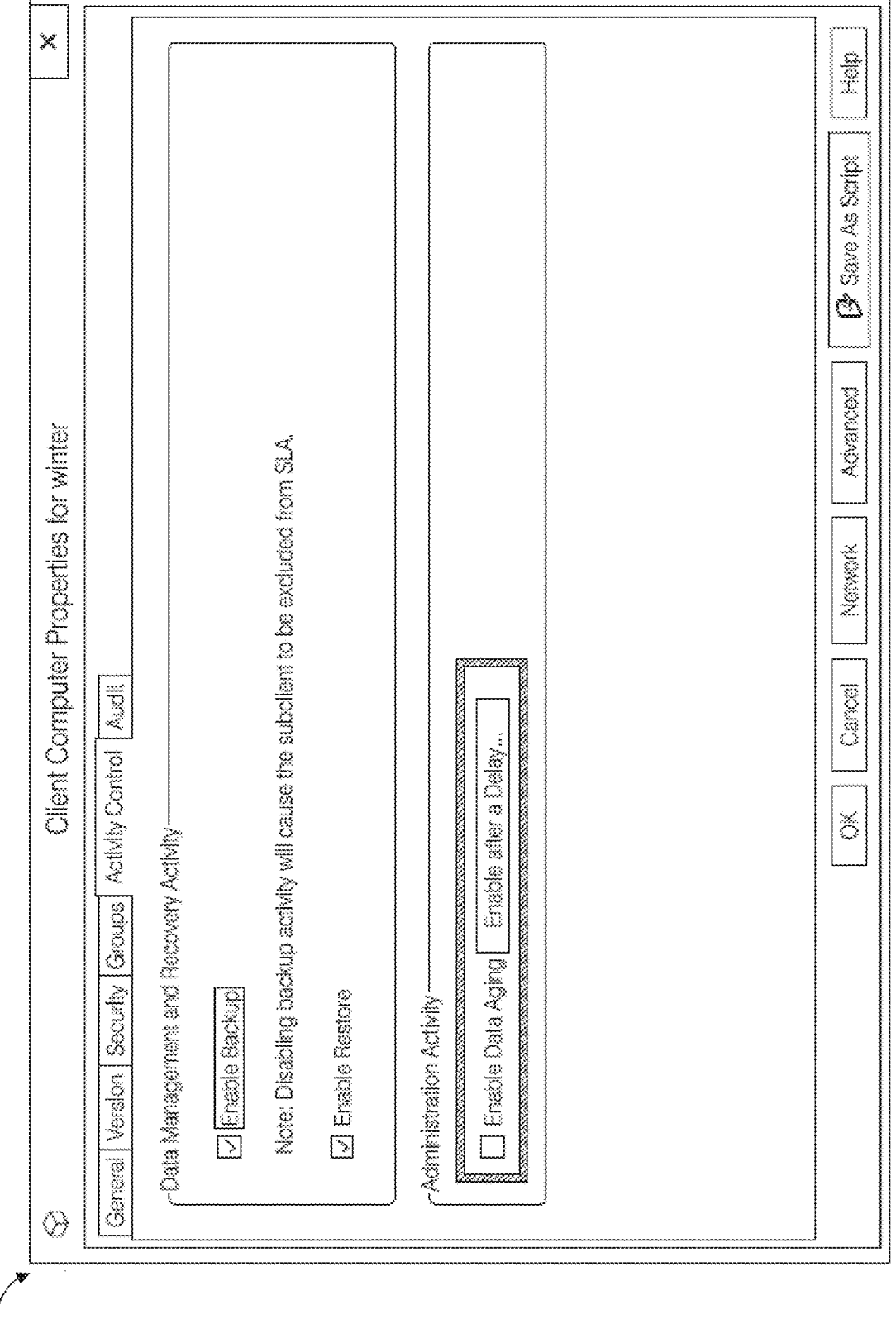
FIG. 13 depicts an illustrative graphical user interface showing disabling of data aging in the illustrative system.
Figure 15:
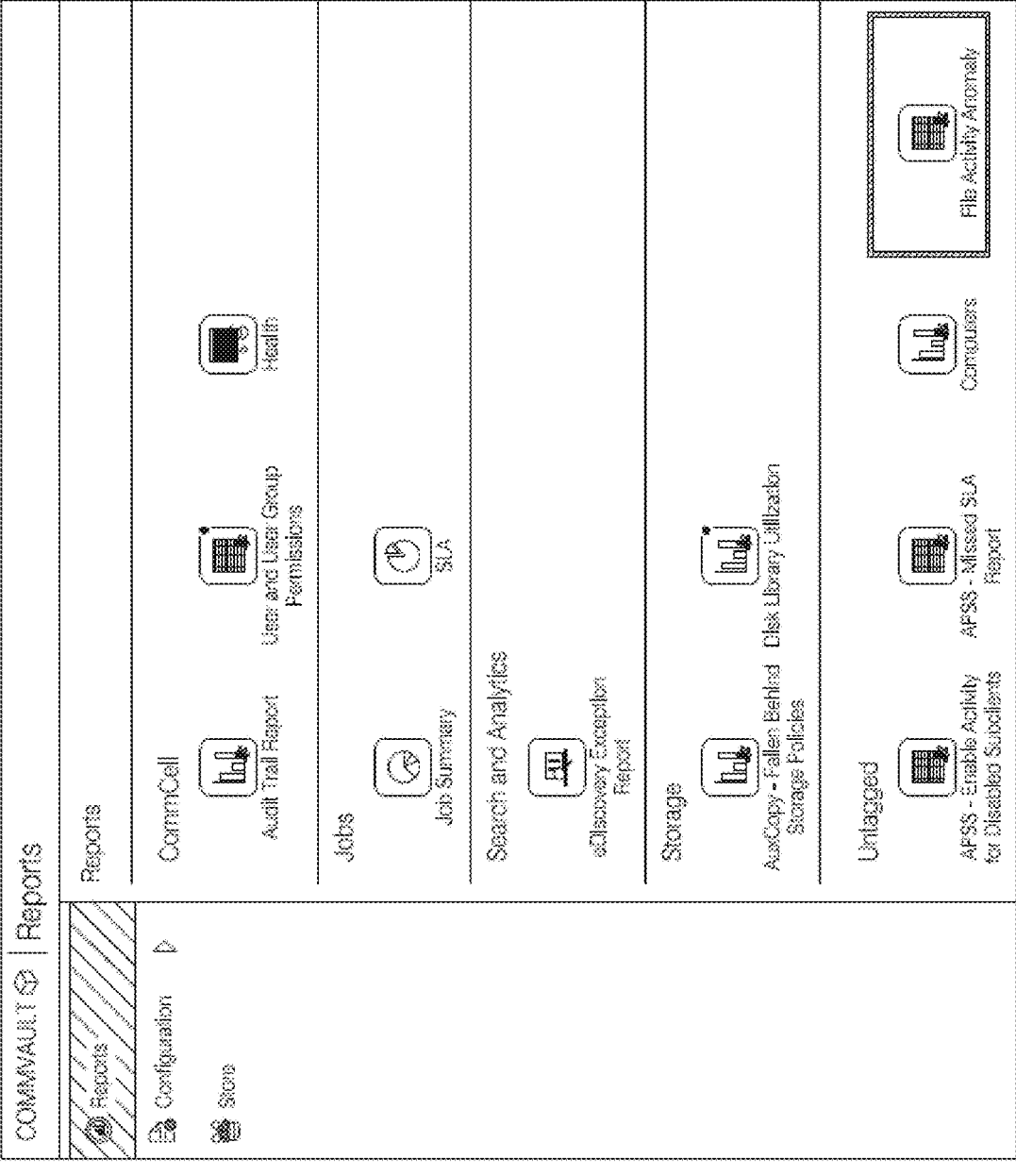
FIG. 15 depicts an illustrative graphical user interface showing creation of a custom report in the illustrative system.
Figure 17:
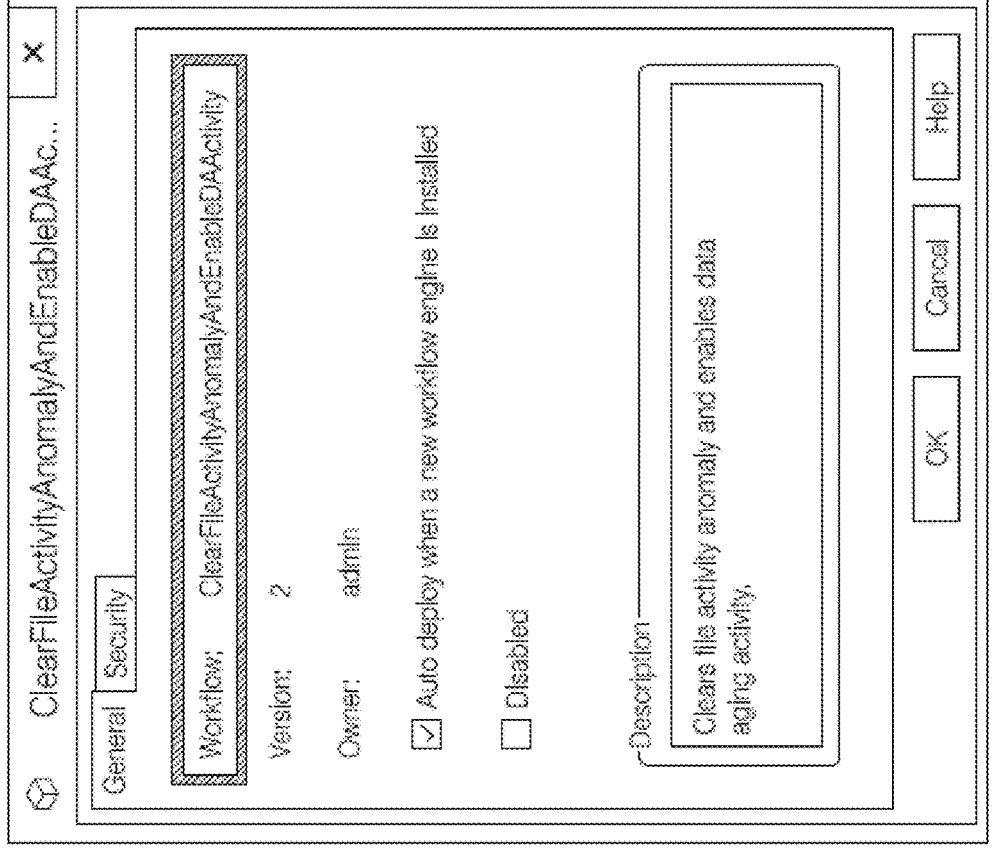
FIG. 17 depicts an illustrative graphical user interface showing enabling of data agent activity in the illustrative system.
Figure 18:
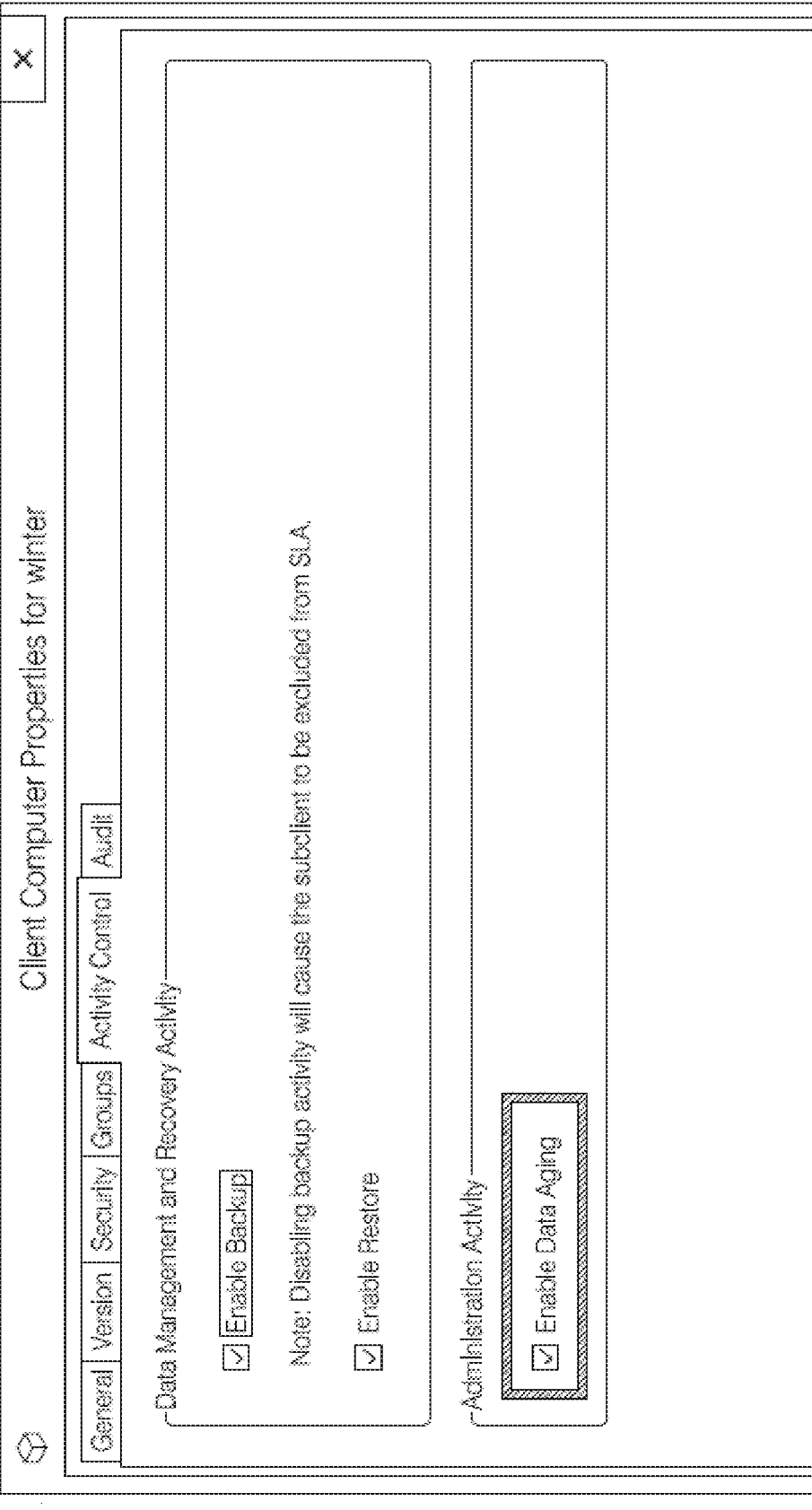
FIG. 18 depicts an illustrative graphical user interface showing enabling of data aging in the illustrative system.
Figure 19:
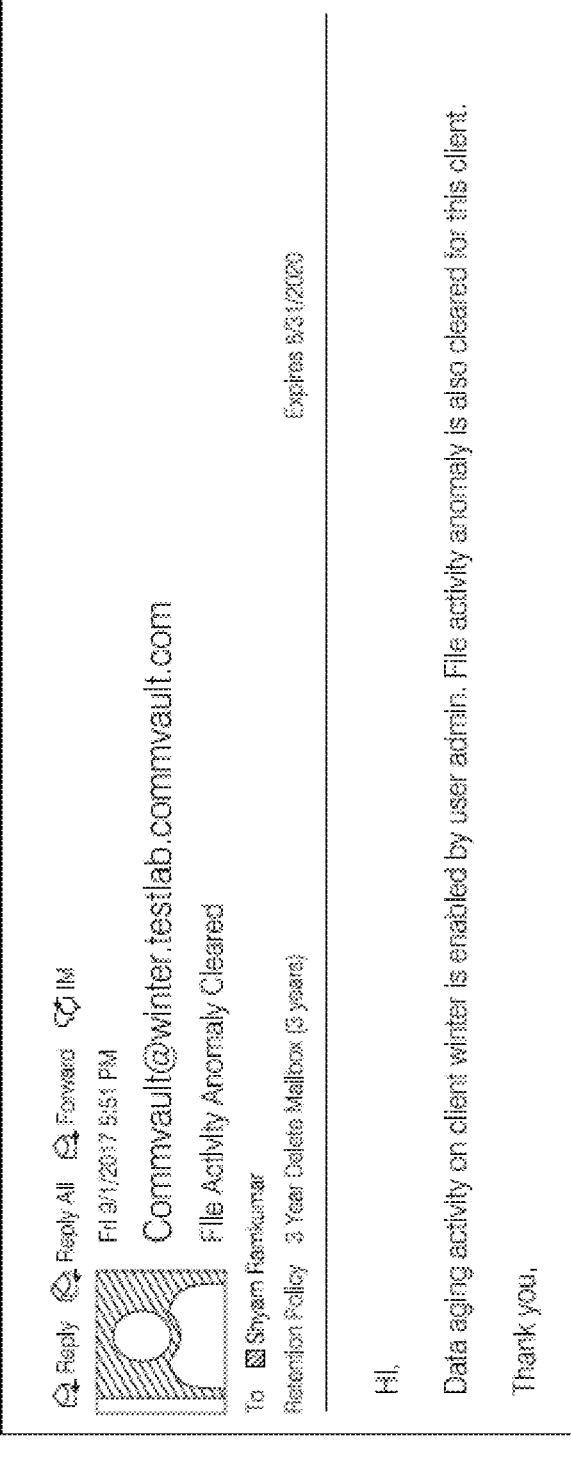
FIG. 19 depicts an illustrative graphical user interface showing an email notification in the illustrative system.

Once a client machine is detected to have a potential ransomware attack, a series of remedial actions and notifications may be performed. For example, as shown in FIG. 12, a file activity anomaly event may be generated for the detected file activity anomaly. FIG. 13 shows that data aging has been automatically disabled in response to the detection of the file activity anomaly. Further, as shown in FIG. 14, a file activity anomaly alert may be provided to the user or administrator associated with the client machine on which the file activity anomaly was detected. In addition to the alert, a file activity anomaly report may provided as shown in FIGS. 15 and 16. FIG. 16 further illustrates the details provided along with each file activity anomaly and the user interface elements for clearing the respective file activity anomalies. Upon ensuring that client machine is safe (e.g., the user activating the "Clear" button on the user interface 1600 of FIG. 16), a process to re-enable the disabled modules and/or operations is initiated, as shown in FIG. 17. FIG. 18 shows that data aging has been automatically enabled in response to the clearing of the detected file activity anomaly, and a notification indicating that data aging (or other modules/operations) has been enabled can be provided, as shown in FIG. 19.

Figure 20:
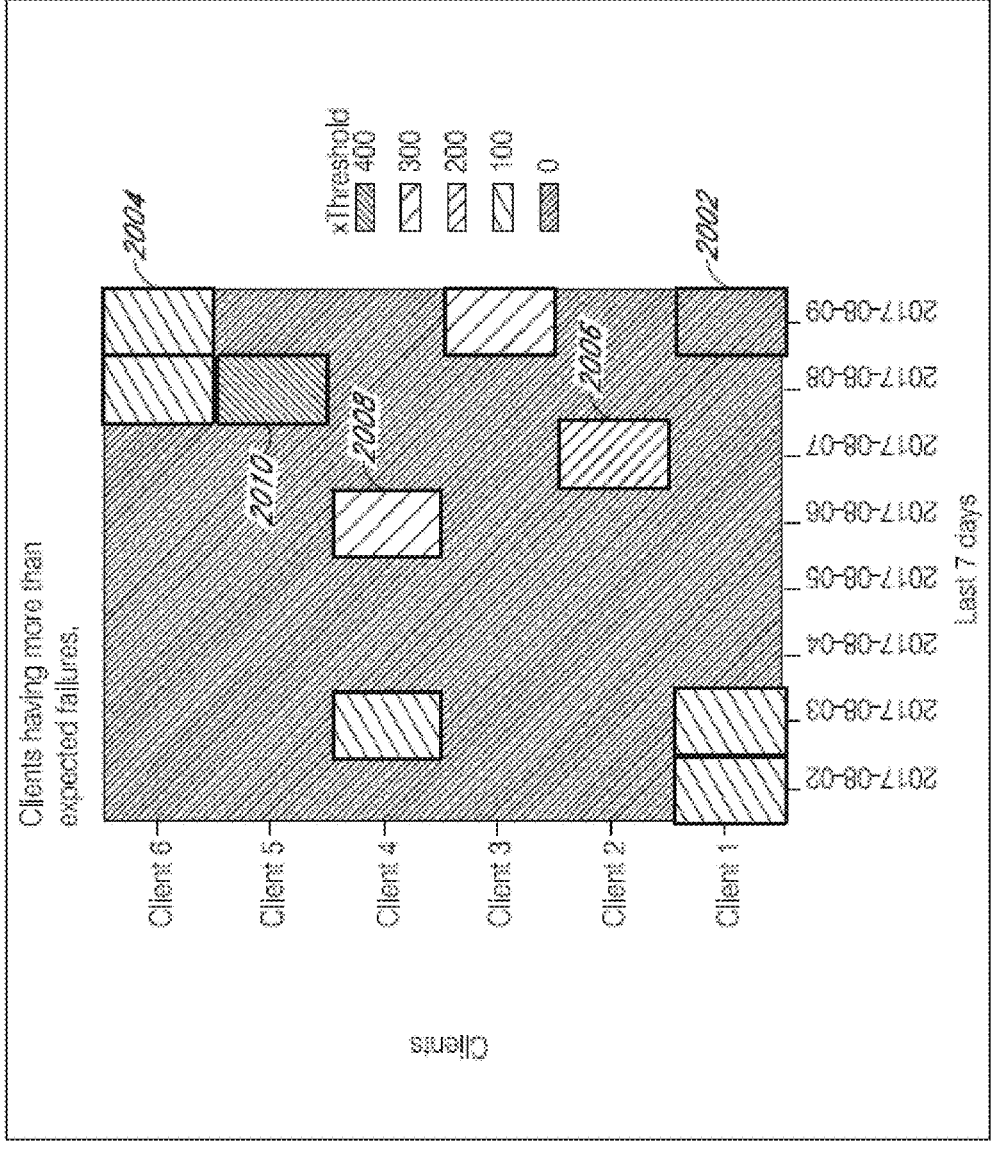
FIG. 20 depicts an illustrative graphical user interface showing clients having more than an expected number of failures in the illustrative system.

FIG. 20 shows a graph indicating, for each client computing machine, the number of failures (e.g., failed data protection operations such as backups, archives, snapshots, auxiliary copies, or the like, or failed file system operations such as file opens, reads, creates, writes, rewrites, deletes, renames, or the like) over time. In the graph shown in FIG. 20, each segment corresponding to a specific client computing machine for a specific time period is assigned a visual indication of the level of failures with respect to a threshold value (e.g., an average number of failures or a pre-determined number of failures). For example, the visual indication may be color. In the example of FIG. 20, bright green (e.g., segment 2002) may indicate a number of failures below a threshold level (e.g., more than 50% lower), yellowish green (e.g., segment 2004) may indicate a number of failures near the threshold level (e.g., within 50%), light orange (e.g., segment 2006) may indicate a number of failures above the threshold level (e.g., more than 50% higher), dark orange (e.g., segment 2008) may indicate a number of failures that is even greater (e.g. more than 100% higher), and red (e.g., segment 2010) may indicate a number of failures that is dangerously high (e.g., more than 400% higher). In other embodiments, visual indications other than color may be used (e.g., icon, symbol, shading, etc.). The graph shown in FIG. 20 may allow the user to see which client computing machine was experiencing an abnormally high number of failures during which time period. The graph shown in FIG. 20 may also allow the user to determine whether the abnormally high number of failures is experienced by multiple client computing machines and/or over specific time periods. In some cases, an abnormally high number of failures indicates a potential ransomware attack.

Although the number of failures is used as an example, the techniques described with respect to FIG. 20 can be applied to the number of file system operations, or other operations indicative of a potential ransomware attack.

FIGURES

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation.

EXAMPLE EMBODIMENTS (EES)

Some example enumerated embodiments of the present invention are recited in this section in the form of methods, systems, and non-transitory computer-readable media, without limitation.

EE 1: A computer-implemented method for detecting file activity anomalies, the method comprising: causing a copy of primary data associated with a client computing device to be stored in one or more secondary storage devices as part of secondary data associated with the client computing device; removing, at a first time, at least some of the secondary data stored in the one or more secondary storage devices according to a secondary data retention policy associated with the client computing device; detecting, at a second time subsequent to the first time, a file activity anomaly based at least on one or more file system operations performed on the client computing device satisfying one or more threshold conditions associated with the client computing device; in response to detecting the file activity anomaly, disabling removal of the secondary data associated with the client computing device from the one or more secondary storage devices according to the secondary data retention policy; and outputting a notification indicating at least the file activity anomaly.

EE 2: The computer-implemented method of EE 1, further comprising: monitoring file system operations performed on the client computing device over a specific time period preceding the second time; determining a baseline count of file system operations performed on the client computing device over the specific time period; and determining, based at least on the baseline count, at least one threshold condition of the one or more threshold conditions.

EE 3: The computer-implemented method of EE 2, wherein the baseline count is an average number of file system operations performed on the client computing device for each sub-period of a plurality of sub-periods within the specific time period.

EE 4: The computer-implemented method of EE 2, further comprising determining the at least one threshold condition at least by multiplying the baseline count with a predetermined percentage value, wherein the predetermined percentage value is greater than 100 percent.

EE 5: The computer-implemented method of EE 2, further comprising periodically determining whether a current count of file system operations satisfies the one or more threshold conditions for each of a plurality of time periods subsequent to the specific time period and each having a same length as the specific time period.

EE 6: The computer-implemented method of EE 1, wherein the one or more file system operations comprise at least one of write operations, create operations, rename operations, or delete operations.

EE 7: The computer-implemented method of EE 1, wherein the secondary data retention policy specifies a retention period after which the secondary data is to be removed from the one or more secondary storage devices.

EE 8: The computer-implemented method of EE 1, further comprising disabling, in response to detecting the file activity anomaly, backup of the primary data from the client computing device to the one or more secondary storage devices.

EE 9: The computer-implemented method of EE 1, further comprising: determining an indication of an input by a user of the client computing device for clearing the file activity anomaly; and in response to determining the indication of the input, re-enabling removal of the secondary data associated with the client computing device from the one or more secondary storage devices according to the secondary data retention policy.

EE 10: The computer-implemented method of EE 1, further comprising: determining an indication of an input by a user of the client computing device for clearing the file activity anomaly; and in response to determining the indication of the input, updating the one or more threshold conditions such that, subsequent to updating the one or more threshold conditions, a file activity anomaly is not detected for at least a specific type of file system operations.

EE 11: A system for detecting file activity anomalies, the system comprising: a client computing device comprising computer hardware and configured to perform one or more file system operations within a file system residing on the client computing device; and one or more secondary storage devices comprising computer hardware and configured to store secondary data associated with the client computing device, wherein the secondary data is a copy of primary data stored on one or more primary storage devices associated with the client computing device, wherein the client computing device configured to: remove, at a first time, at least some of the secondary data stored in the one or more secondary storage devices according to a secondary data retention policy associated with the client computing device; detect, at a second time subsequent to the first time, a file activity anomaly based at least on the one or more file system operations satisfying one or more threshold conditions associated with the client computing device; in response to detecting the file activity anomaly, disable removal of the secondary data associated with the client computing device from the one or more secondary storage devices according to the secondary data retention policy; and output a notification indicating at least the file activity anomaly.

EE 12: The system of EE 11, wherein the client computing device is further configured to: monitor file system operations performed on the client computing device over a second time period preceding the first time period; determine a baseline count of file system operations performed on the client computing device over the second time period; and determine, based at least on the baseline count, the threshold value for disabling the one or more data protection operations.

EE 13: The system of EE 12, wherein the baseline count is an average number of file system operations performed on the client computing device for each sub-period of a plurality of sub-periods within the second time period.

EE 14: The system of EE 12, wherein the client computing device is further configured to determine the threshold value by multiplying the baseline count with a predetermined percentage value, wherein the predetermined percentage value is greater than 100 percent.

EE 15: The system of EE 11, wherein the set of file system operations comprises at least one of write operations, create operations, rename operations, or delete operations.

EE 16: The system of EE 11, wherein the client computing device is further configured to periodically determine whether a current count of file system operations exceeds the threshold value for each of a plurality of time periods subsequent to the first time period and each having a same length as the first time period.

EE 17: The system of EE 11, wherein the client computing device is further configured to disable a data aging operation such that the secondary data associated with the client computing device is preserved.

EE 18: The system of EE 11, wherein the client computing device is further configured to disable a backup operation associated with the client computing device such that an additional backup copy associated with the client computing device is not created on the one or more secondary storage devices.

EE 19: The system of EE 11, wherein the client computing device is further configured to: determine an indication of an input by a user of the client computing device for clearing the file activity anomaly; and in response to determining the indication of the input, re-enable the one or more data protection operations.

EE 20: The system of EE 11, wherein the client computing device is further configured to: determine an indication of an input by a user of the client computing device for clearing the file activity anomaly; and in response to determining the indication of the input, update one or more rules for disabling the one or more data protection operations such that, subsequent to updating the one or more rules, a file activity anomaly is not detected for at least a specific type of file system operations despite being associated with a count exceeding the threshold value.

EE 21: A computer-implemented method as generally shown and described herein and equivalents thereof.

EE 22: A system as generally shown and described herein and equivalents thereof.

EE 23: A non-transitory computer readable medium storing instructions, which when executed by at least one computing device, perform a method as generally shown and described herein and equivalents thereof.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

TERMINOLOGY

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method for detecting file activity anomalies, the computer-implemented method comprising, with one or more computing devices:

monitoring file system operations performed on primary data by a client computing device;

performing at least a first data protection operation that copies at least a portion of the primary data associated with the client computing device to one or more secondary storage devices as part of secondary data associated with the client computing device;

detecting a file activity anomaly based at least on one or more first file system operations of the file system operations performed on the primary data, the one or more first file system operations satisfying one or more threshold conditions; and subsequent to detecting the file activity anomaly, overriding the detection of the file activity anomaly based at least on second file system operations performed on primary data associated with multiple client computing devices.

2. The computer-implemented method of claim 1, wherein overriding the detection of the file activity anomaly prevents disabling of one or more operations associated with the secondary data.

3. The computer-implemented method of claim 2, wherein overriding the detection of the file activity anomaly prevents disabling of one or more data removal operations associated with the secondary data.

4. The computer-implemented method of claim 1, further comprising determining based on at least the second file system operations that the detected file system anomaly is a false positive.

5. The computer-implemented method of claim 4, wherein the determining comprises identifying a pattern based on at least the second file system operations and determining that the one or more first file system operations are consistent with the pattern.

6. The computer-implemented method of claim 1, wherein overriding the detection of the file activity anomaly prevents notifying a user about the detected file activity anomaly.

7. The computer-implemented method of claim 1, wherein the one or more file system operations comprise at least one of write operations, create operations, rename operations, or delete operations.

8. A system comprising:

one or more computing devices comprising computer hardware and configured to perform one or more file system operations within a file system residing on at least one computing device of the one or more computing devices; and one or more secondary storage devices comprising computer hardware and configured to store secondary data associated with the at least one computing device, wherein the secondary data is a copy of primary data stored on one or more primary storage devices associated with the at least one computing device, wherein the one or more computing devices are configured to:

detect a file activity anomaly based at least on one or more first file system operations of the one or more file system operations performed on the primary data; and subsequent to detecting the file activity anomaly, override the detection of the file activity anomaly based at least on second file system operations performed on primary data associated with multiple computing devices.

9. The system of claim 8 wherein the override of the detection of the file activity anomaly prevents disabling of one or more operations associated with the secondary data.

10. The system of claim 9 wherein the override of the detection of the file activity anomaly prevents disabling of one or more data removal operations associated with the secondary data.

11. The system of claim 8, wherein the one or more computing devices are further configured to determine based on at least the second file system operations that the detected file activity anomaly is a false positive.

12. The system of claim 11, wherein the determination that the file activity anomaly is a false positive comprises identifying a pattern based on at least the second file system operations and determining that the one or more first file system operations are consistent with the pattern.

13. The system of claim 8, wherein the override of the detection of the file activity anomaly prevents notifying a user about the detected file activity anomaly.

14. The system of claim 8, wherein the one or more file system operations comprise at least one of write operations, create operations, rename operations, or delete operations.

* * * * *